United States Patent [19]

Levy

[11] Patent Number: 5,351,151
[45] Date of Patent: Sep. 27, 1994

[54] OPTICAL FILTER USING MICROLENS ARRAYS

[76] Inventor: George S. Levy, 3980 Del Mar Meadows, San Diego, Calif. 92130

[21] Appl. No.: 11,743

[22] Filed: Feb. 1, 1993

[51] Int. Cl.[5] .................. G02B 27/10; G02B 23/00
[52] U.S. Cl. .................. 359/240; 359/237; 359/252; 359/259; 359/275; 359/256; 359/276; 359/282; 359/284; 359/419
[58] Field of Search .............. 359/240, 237, 252, 259, 359/275, 256, 276, 282, 284, 419; 356/376

[56] References Cited

U.S. PATENT DOCUMENTS

| | | |
|---|---|---|
| 3,020,406 | 2/1962 | Whitney . |
| 3,658,467 | 4/1972 | Kitano . |
| 3,714,430 | 1/1973 | Finvold . |
| 4,331,380 | 5/1982 | Rees . |
| 4,435,039 | 3/1984 | Rees . |
| 4,948,258 | 8/1990 | Caini .................. 365/376 |
| 5,062,693 | 11/1991 | Beratan . |
| 5,270,859 | 12/1993 | Wirth et al. .................. 359/422 |

FOREIGN PATENT DOCUMENTS 57-188010 11/1982 Japan .
40440495 8/1991 Japan .

OTHER PUBLICATIONS

R. J. Wohl, "Short Length Optical System", IBM T.D.B., vol. 13, No. 10, p. 2947, Mar./1971.

Primary Examiner—Viet Q. Nguyen
Attorney, Agent, or Firm—John R. Ross

[57] ABSTRACT

An optical filter device comprised of two parallel arrays of lenses. Each lens in the first array faces a lens in the second array to form a pixel. Lens pairs in a pixel are separated by the sum of their focal distances and include in their common focal surface a "smart" layer for modulating light passing through the focal surface. Preferred embodiments include car rear view mirrors, sunglasses, glasses for night driving, laser goggles, nuclear goggles, sun visors, sun shields, windshields, space suit helmet visors, optical instrument protection devices, window filters and energy conservation devices.

78 Claims, 24 Drawing Sheets

OPTICAL FILTER USING MICROLENS ARRAYS

This invention relates to optical instruments and more particularly to optical fibers

BACKGROUND OF THE INVENTION

The conventional approach to, or prior art of optical filtering is usually of one of two kinds. The first, spatial optical filtering, is exemplified by instruments such as telescopes, microscopes and cameras. The second kind, spectral optical filtering, is exemplified by sunglasses.

Spatial light filters use lenses to create a virtual image that can be seen by the user, or a real image that is projected on a screen or a photosensitive plate. These instruments are bulky because of the optical limitations of the component lenses: dimensions associated with these instruments must be roughly equal to the sum of the lenses' focal lengths. This problem is partially resolved by the use of prisms, but this solution increases the weight.

Spectral filters use a light modifying layer inserted between the scene and the eye or detector. This results in a spatially uniform attenuation of all the rays reaching the eye or detector. Adaptable spectral filters use phototropic materials that allow, for example, the attenuation to vary with the intensity of the light. These filters are exemplified by photochromic sunglasses. While the attenuation may vary in time with the intensity of the incident light, it is uniform in space for all rays reaching the eye.

Filters have been designed that combine both spatial and spectral filtering. They use a layer of phototropic material located at the focal plane of an optical system. This was proposed in U.S. Pat. No. 3,714,430 by Finvoid et al. and U.S. Pat. No. 3,020,406 by Whitney. Lenses in these filters project an image of the scene on special phototropic material located at the focal plane of the lenses. Light rays originating from bright objects generate dark spots on the phototropic layer and are automatically dimmed by the same spots they generate. Thus, bright rays are self attenuated and dim rays are unaffected. Because of the nonlinear attenuation of the phototropic material, these filter devices permit light detectors to function within their operational dynamic range and prevent bright sources beyond their dynamic range from saturating or damaging the detectors.

These filters use conventional optics and can be bulky. Their field of view is limited. There is a need to extend this technology to provide a very compact solution and widen the field of view. There is also a need to extend this technology to protect human eyes in addition to inanimate detectors.

Very compact and light optical spatial filters have been built using microlenses with the main domain of application being photocopying machines. U.S. Pat. No. 3,658,407 by Ichiro Kitano et al, describes an image transmitter comprised of a bundle of optical fibers made of glass or synthetic resin in which each fiber has an index of refraction that varies parabolically outward from the fiber central axis. Each fiber acts as a focusing lens to transmit part of an image of an object placed near one end. The fiber lenses are produced under the trade name "SELFOC"; the mark is registered in Japan and owned by the Nippon Sheet and Glass Co. Ltd.

This idea is further developed in U.S. Pat. Nos. 4,331,380 and 4,435,039 by James Rees, in which the slant and length of each optical fiber are used to control the device magnification.

As described by prior art, devices using microlens arrays are only capable of performing spatial optical filtering. They do not address the problem of simultaneous spatial and spectral optical filtering.

Unresolved problem areas include, in the domain of combined spectral and spatial filtering, improved car rear view mirrors, car and plane sun visors, windshields, sunglasses, glasses for night driving, laser goggles, nuclear goggles, color shifting goggles (i.e., UV to light), hat sun visors, sun shields, space suit helmets and visors, space station windows, optical instrument protection devices, window shields; in the domain of energy conservation: roofing materials and energy conservation transparent panels.

SUMMARY OF THE INVENTION

This invention uses arrays of small lenses and nonlinear optical materials to provide a compact and lightweight solution to the generalized spatial and spectral optical filtering problem. I begin by developing the concept, and define the basic properties of the transflector. A transflector shown in FIG. 1A and 1B, is comprised of two parallel lens arrays arranged on a two dimensional surface. The surfaces can be flat or have a curvature. Each lens in the first array faces a lens in the second array such that the lens pairs form pixels. The separation between the lenses in a pixel is approximately equal to the sum of their focal lengths. In general, each pixel optical axis may be normal to the surface of the transflector or may be slanted, at an angle in comparison with the normal. We shall refer to pixels with an angle perpendicular to the surface of the transflector as "normal" pixels, and with an angle slanted with respect the perpendicular as "slanted" pixels. The property of a transflector such as gain, field of view and focal distance is derived from variations in the curvatures for each of the two side of the transflector, individual pixel gain, individual pixel slant and the type of nonlinear material or composite layer inserted at the transflector focal plane. The transflector is a versatile element in the design of extremely compact spatial optical instruments: a single transflector can be used to build a non-inverting microscope or a camera. Two transflectors in a sandwich can be used to build a non-inverting telescope.

The present invention provides optical devices which utilize transflectors incorporating a phototropic layer in the focal plane between the two component arrays. These transflectors combine the capabilities of spectral filters and spatial filters. They can process light in a unique manner. For example, they can attenuate bright rays while leaving dim rays unaffected as shown in FIG. 1B. As a result, bright objects such as the sun 6 can be dimmed, while dim objects 7 located close to these bright objects are left unaffected. I call these transflectors "smart transflectors." They can be used to construct smart windows and smart mirrors. Smart windows are generic components for several applications such as sunglasses, glasses for night driving, laser goggles, nuclear goggles, sun visors, sun shields, windshields, space suit helmet visors, space station window, optical instrument protection devices, window filters and energy conservation devices. Smart mirrors are generic components for applications such as automobile rearview mirrors. Transflectors using arrays of lenses with different focal lengths ($f_1 \neq f_2$) can be used to construct smart windows and mirrors that also magnify or reduce. Magnifying windows and mirrors that are not smart (do not include a phototropic layer) are generic components for applications such as planar telescopes, microscopes, cameras and projectors. These devices are described in a companion patent application filed currently herewith.

When I use the term optical filters in this application, 1 intend for it to refer to filters operating on the visible as well as on other areas of the electromagnetic spectrum such as infrared and ultraviolet.

DETAILED DESCRIPTION OF PREFERRED EMBODIMENTS

The present invention can be described by reference to the drawings.

Description of the Transflector

Figure 1A:
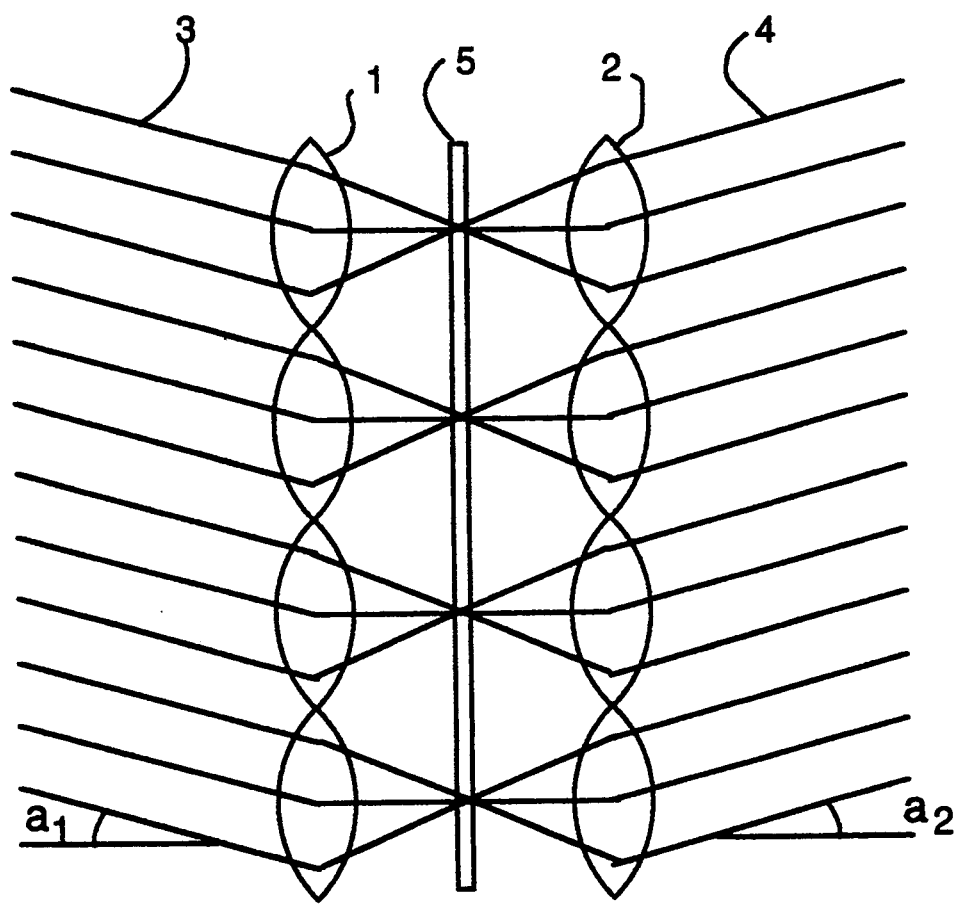
FIG. 1A describes a transflector array
Figure 1B:
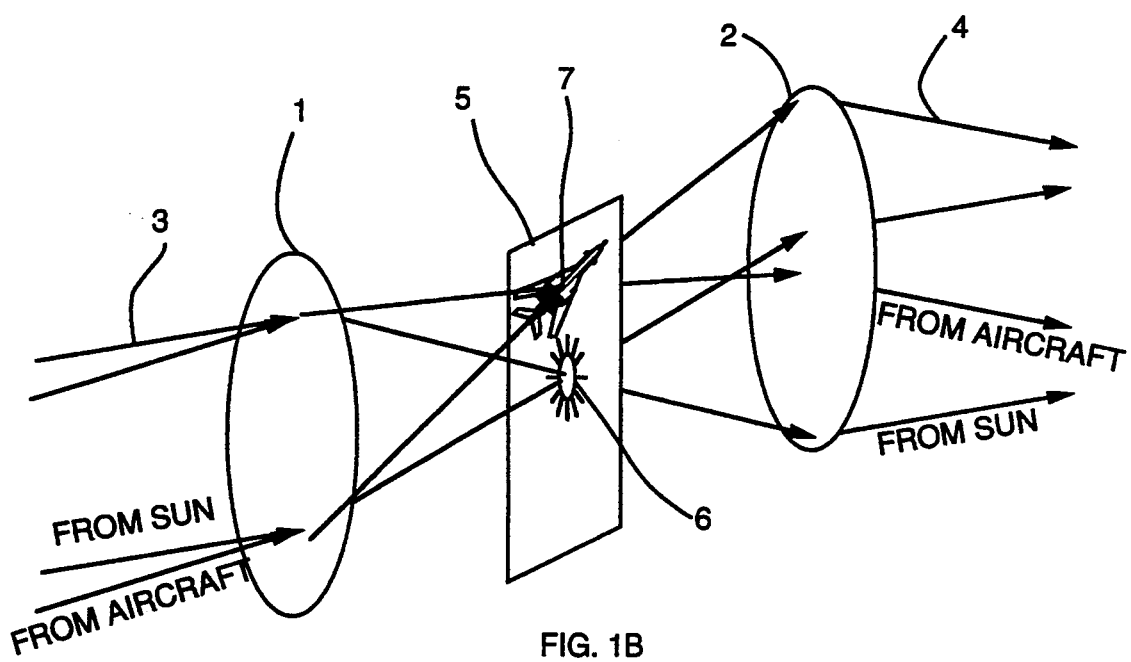
FIG. 1B provides a three dimensional view of a smart transflector pixel with the sun focused on the smart layer.

This invention first develops the concept of the "transflector," a term which I created. As shown in FIG. 1A and 1B, a transflector is comprised of two parallel lens arrays 1 and 2, arranged on a two dimensional surface and approximately conforming to each other. The surface of the arrays can be flat or have a curvature. Each lens in the first array faces a lens in the second array such that the lens pairs form pixels. The separation between the lenses in a pixel is approximately equal to the sum of their focal lengths. This separation results in the arrays sharing a focal plane located between them. If needed, a layer of phototropic material 5 may be included in the common focal plane between the lens arrays, to modulate and/or control light going through. Transflectors including such a layer shall be called "smart transflectors." In general, each pixel optical axis may be normal to the surface of the transflector or may be slanted, at an angle in comparison with the normal. We shall refer to pixels with an angle perpendicular to the surface of the transflector as "normal" pixels, and with an angle slanted with respect to the perpendicular as "slanted" pixels.

To my knowledge, no one has yet shown a full systematic understanding of how transflectors relate to, and differ from other fundamental optical devices such as transmission panels, reflectors, lenses and arrays of corner reflectors, and no one has utilized their unique properties in the design of compact spatial and spectral filters. No one at present, makes use of the rich set of properties that transflectors have, and which are derived from variations in the transflector curvature, individual pixel gain, individual pixel slant and the insertion of a smart layer at the transflector focal plane.

Unity-Gain Flat Transflectors With Normal Pixels

The name transflector combines "transmitter" (trans) with "deflector" or "reflector" (flector). A transflector transmits and may modulate light by combining attributes of a transmission panel and a reflector.

For the purpose of understanding, we shall first derive results omitting the phototropic layer and assuming very thin transflectors and pixels small in comparison with the other dimensions in the optical environment. We shall then include the phototropic layer and use realistic dimensions in describing the preferred embodiments.

Thus, let us assume now very small pixels and a very thin transflector. When the focal length f is identical in both arrays ($f = f_1 = f_2$) the arrays are separated by an interval 2f. The transflector has then a gain or a magnifying power equal to unity. Unity gain transflectors have the unique optical property of transmitting light in a direction exactly opposite to that of reflected light. In other words, transflected light is colinear with reflected light but travels in the opposite direction. More precisely as shown in FIG. 1A, any ray 3 entering one array at angle $a_1$, exits 4 the second array at angle $a_2$, where $a_2$ is the negative of $a_1$. The transflector behavior bears some resemblance with Braggs scattering except that the angular relationships between the input and output beams is purely geometric as in reflection. In Braggs scattering, this angular relationship depends on the direction of propagation of acoustic waves in a medium.

Figure 2A:
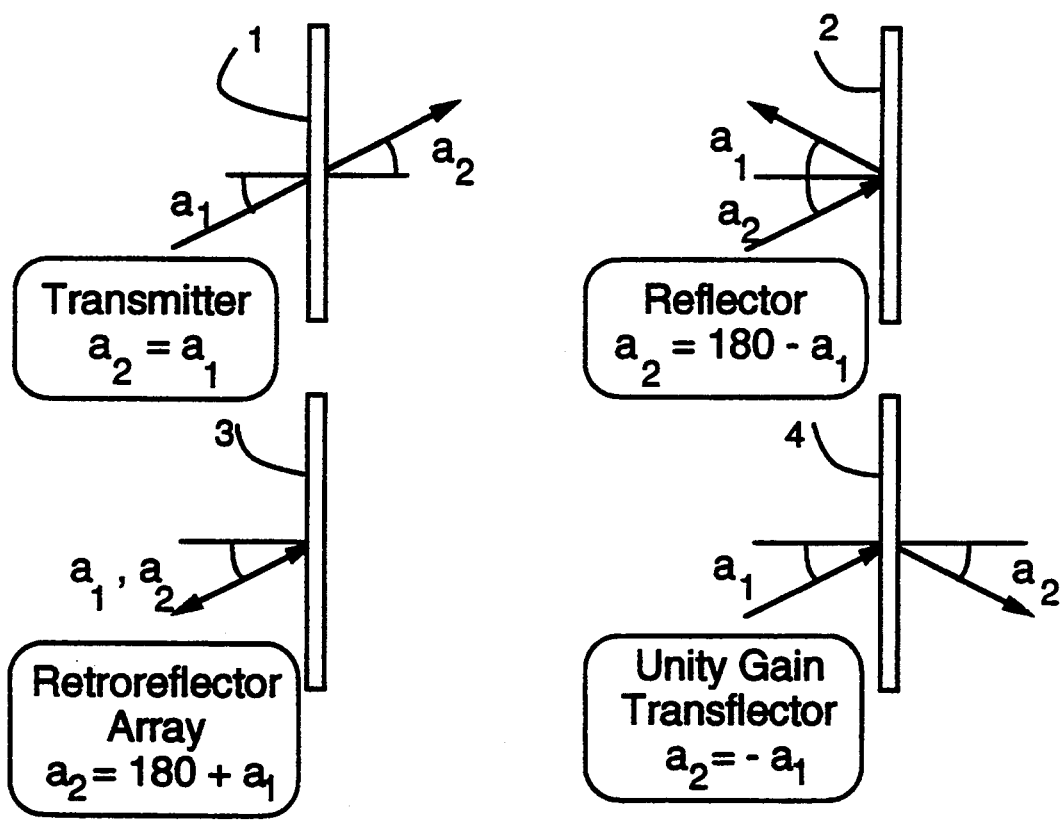
FIG. 2A explains the function of a transflector in relation to other optical systems.

FIG. 2A describes the functionality of a unity-gain transflector 4 in relation to other well known optical devices and compares the angle $a_1$ of the incident beam with the angle $a_2$ of the output beam. These devices include a simple transmission window 1 for which $a_2 = a_1$; a reflecting plate 2 for which $a_2 = 180 - a_1$; an array of micro retroreflectors for which $a_2 = 180 + a_1$; and a unity gain transflector for which $a_2 = -a_1$. This angular relationship between input rays and output rays is the basic transflection relationship for the unity gain case, and can be used to derive the following corollaries valid for very thin transflectors with very small pixels:

Corollary 1: rays entering a unity gain transflector in parallel formation exit the transflector also in parallel formation. This behavior differs sharply from conventional lenses which do not conserve parallelism of rays.

Figure 2B:
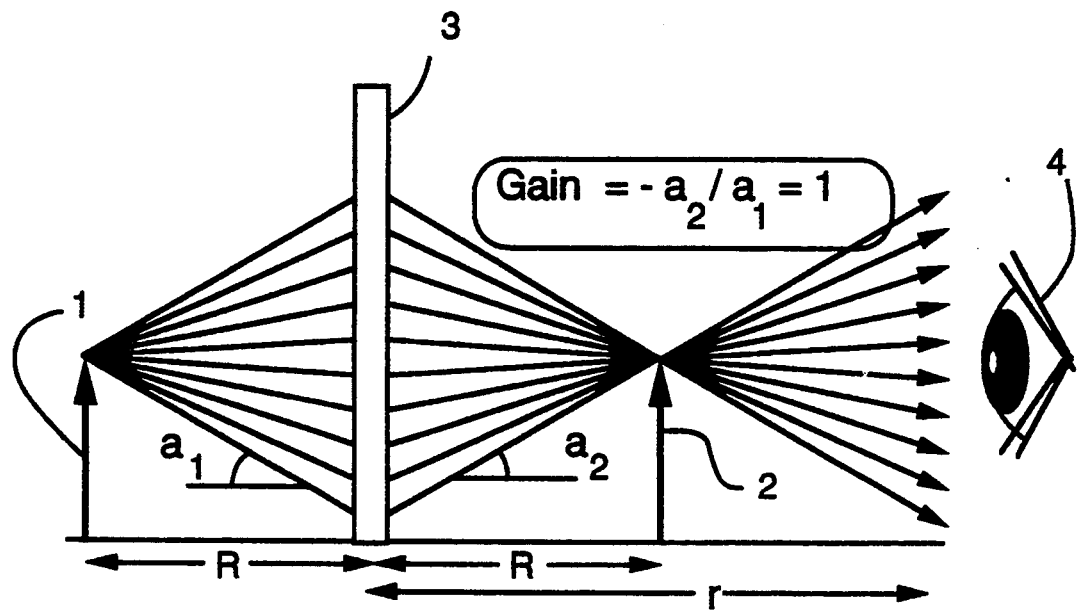
FIG. 2B illustrates how a unity-gain transflector can focus near-by objects.

Corollary 2: as shown in FIG. 2B, a unity gain transflector 3 can focus light originating from an object 1 located at an arbitrary distance R on one side, onto a focal plane also at distance R but on the other side. The distance R is completely independent of the focal length $f = f_1 = f_2$ of the lenses constituting the transflector. The image 2 appears upright to, and at a distance r-R from an observer 4 located at a distance $r > R$ from the transflector. This image is pseudoscopic which means that depth information is inverted. Objects which are closer, appear further away in the image and vice-versa.

Figure 2C:
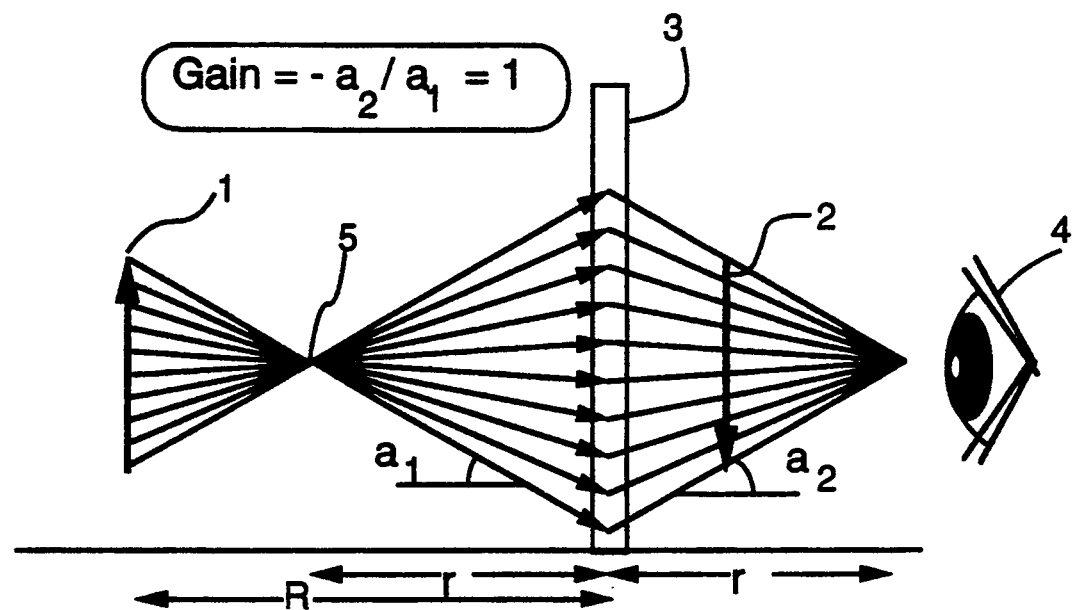
FIG. 2C shows how a unity-gain transflector can focus a distant object.

Corollary 3: as illustrated in FIG. 2C, given an object 1 at distance R from a unity-gain transflector 3, an observer 4 placed at a distance $r < R$ on the other side, observes an inverted virtual image 2 located at distance R−r from him. In other words, the transflector provides the observer with a different and inverted point of view located at point 5 and at distance R−r from the object 1.

Figure 2D:
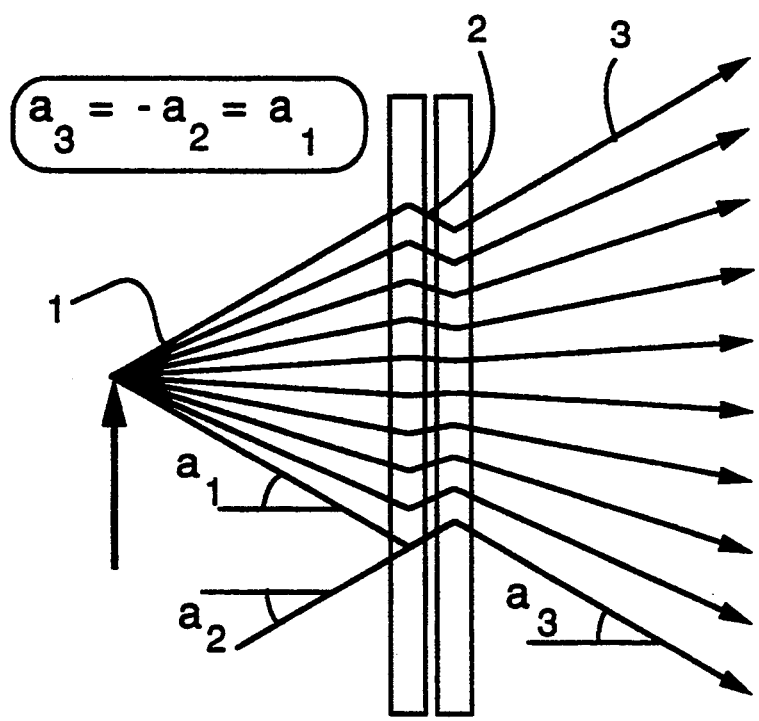
FIG. 2D demonstrates how a window can be constructed.

Corollary 4: two unity-gain transflectors placed back to back as shown in FIG. 2D cancel each other out and appear to be a simple transmission window: the light rays deflected by the first transflector are redressed by the second transflector. Incident rays 1 arriving at the first transflector at angle $a_1$ are transflected to angle $a_2 = -a_1$ as shown in 2. However, the rays are then redressed by the second transflector to angle $a_3 = -a_2 = a_1$ as shown in 3. As a result, the angle of the transmitted rays are equal to the angle of the incident rays $a_3 = a_1$. This corollary has relevance to the design of smart windows and smart mirrors. An image seen through this optical system appears slightly closer to the observer than in reality because of the distortions within the transflector. For very thin transflectors this effect is not noticeable and the image appears identical to the original.

Non-Unity Gain, Flat Transflectors with Normal Pixels

More general results can be obtained for transflectors using normal pixels with a uniform non-unity-gain G. These pixels can be built by using unequal focal lengths $f_1$ and $f_2$. It can be shown that input/output angular relationship for each light ray takes the more general form of $a_2 = -Ga_1$ where $G = f_1/f_2$ for small angles $a_1$ and $a_2$. The small angle requirement is analogous to the thin lens relationship in optics. If the conditions deviate significantly from the small angle, then the knowledgeable designer can then use the appropriate relationship derived from classical optics.

The non-unity gain capability that transflectors have, can be used to design planar projectors, telescopes, microscopes and cameras. The simplest non-unity gain transflectors are flat, have a uniform gain G (i.e., each pixel has the same gain) and the pixel optical axes are all normal to the surface of the transflector. The four corollaries above can be extended to describe transflectors following these criteria. Very thin transflectors and very small pixels are assumed.

Extended Corollary 1: rays entering in parallel formation, a flat transflector having a non-unity uniform gain G and normal pixels, exit the transflector also in parallel formation.

Figure 3A:
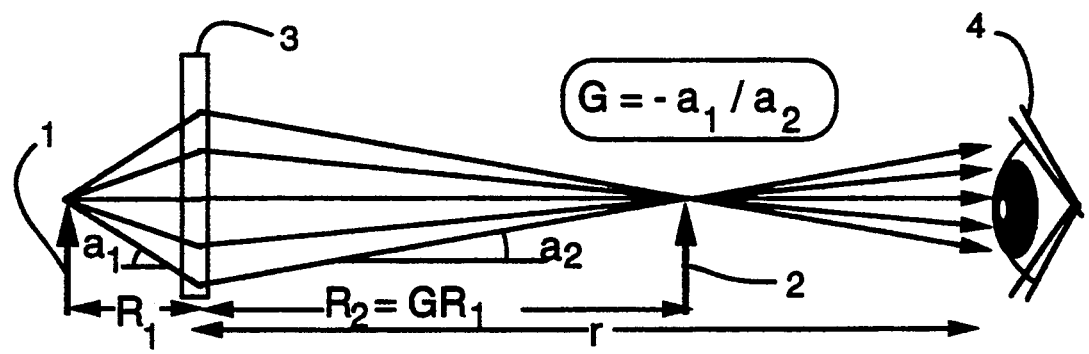
FIG. 3A describes how a smart planar microscope can be built with a flat transflector having a non-unity, uniform gain..

Extended Corollary 2: As illustrated in FIG. 3A, a flat transflector 3 with a non-unity, uniform gain G and normal pixels, can focus light originating from an object 1 located at an arbitrary distance $R_1$ on one side, onto a focal plane at distance $R_2$, on the other side, where $R_2 = GR_1$. The focused image 2 has the same size as the object 1 as can be derived using Extended Corollary 1. The image 2 appears upright to, and at a distance $r - R_2$ from an observer 4 located at a distance $r > R_2$ from the transflector. The image is pseudoscopic.

This corollary points the way to the design of transflector-based smart planar microscopes and cameras, as shall be demonstrated below.

Figure 3B:
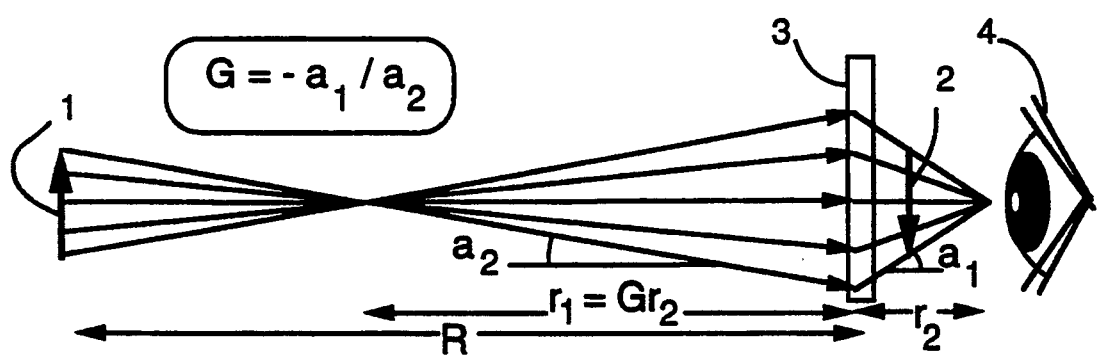
FIG. 3B illustrates how a smart planar telescope can be built with a flat transflector having a non-unity, uniform gain.

Extended Corollary 3: As shown in FIG. 3B, given an object 1 at distance R from a flat transflector 3 with a non-unity gain, an observer 4 located at a distance $r_2 < R/G$ on the other side, observes an inverted virtual image 2 located at distance $R - r_1$ from him, where $r_1 = Gr_2$, provided the angle between the light rays and the transflector optical axis is small. This corollary is the basis for transflector-based smart planar telescopes.

Extended Corollary 4: two transflectors with gains $G_1$ and $G_2$, placed in a sandwich, form a transmission window with gain $G = G_1G_2$. This corollary has relevance in the design of smart magnifying windows, and of non-inverting transflector-based smart telescopes.

Transflector With Large Pixels: Problem of Ray Scrambling Within Each Pixel

Figure 4:
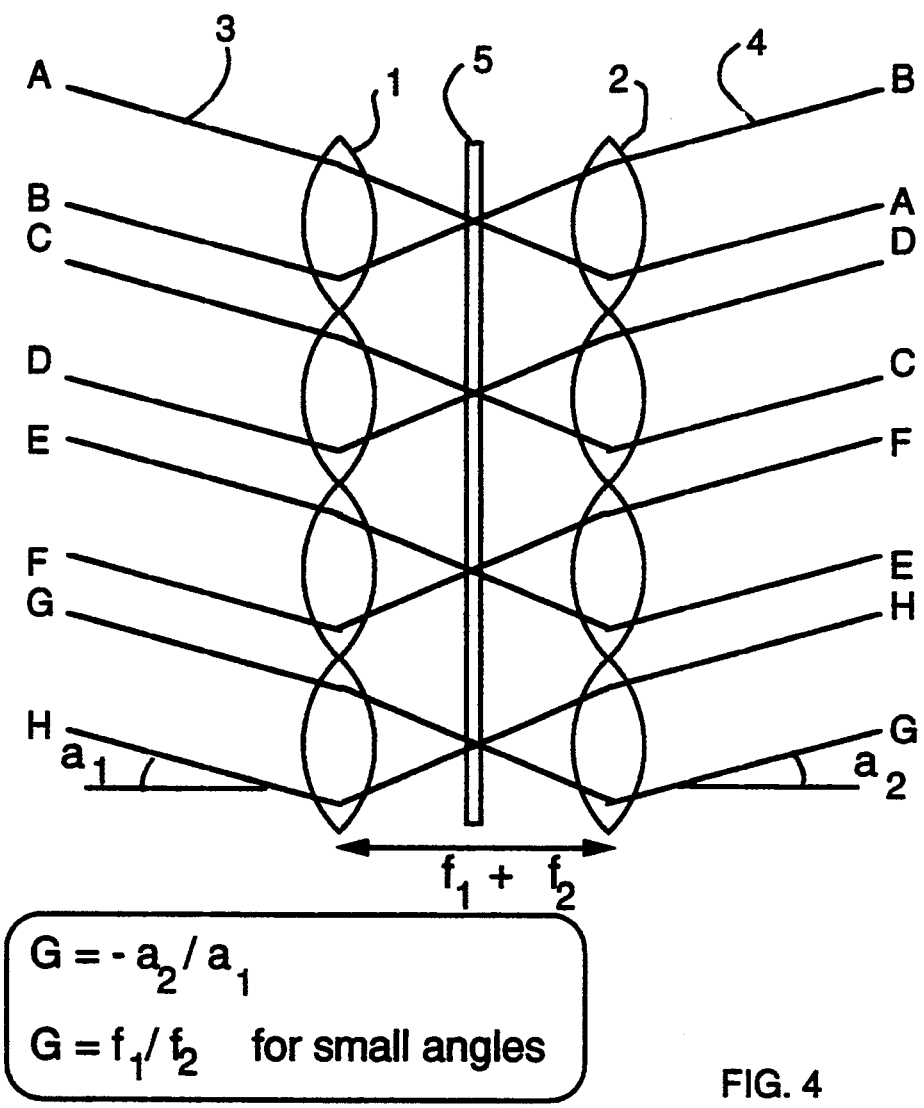
FIG. 4 describes how the rays are scrambled by each transflector pixels.

As illustrated in FIG. 4, light rays entering a transflector are denoted as A,B,C,D,E,F,G,H. As the rays leave the transflector they are scrambled into B,A,D,C,- F,E,H,G. When the pixels are very small this scrambling effect is not significant. However, when the size of the transflector pixels isn't small compared to other dimensions in the optical system, scrambling of the rays within each pixel may results in a discontinuous image. We shall consider two cases:
1) Objects located at large distances (at, or close to infinity) compared to the pixel dimension.
2) Objects located close to the transflector compared to the pixel dimension.

In the first case objects points are located at large distances and generate parallel rays entering the transflector. These rays exit the transflector also in parallel formation (Corollary 1) but within each pixel, they are scrambled. Because the rays are parallel, a focusing lens located behind the transflector can focus these rays into single points on the image plane even though the rays are scrambled. Thus scrambling does not significantly affect the design of devices such as a telescope that operate with objects at or close to infinity, and no special measures need be taken for unscrambling. In the case of a telescope made with a single non-unity gain transflector for example, the eye lens would focus the scrambled but parallel rays onto the retina to form a clear image.

The second case involves objects points located at shod distances compared to the pixel size. These points generate non-parallel rays at the pixels. The problem arising from the scrambling of rays within each pixel can be nullified by placing a lens in front of the transflector to make the incoming rays parallel. The situation reverses to the first case in which the objects are located at or close to infinity. The outgoing rays are scrambled but parallel and can be focused on a sensitive surface to form a clear image. The above discussion suggests an approach which can be useful in the design of optical instruments such as smart microscopes in which the distance between the object and the transflector may be comparable to the size of the transflector pixels.

Another descrambling method involves placing a second transflector in a sandwich with the first such that each pixel in the first transflector faces a pixel in the second. This arrangement allows the rays, scrambled by the first transflector to be unscrambled by the second and is identical to the window construction already discussed in Corollary 4. It has also the benefit of generating an orthoscopic image. This method also redresses the image to an upright position for objects located far away as described in Corollary 3.

Existing patents and the technical literature provides other solutions specifically oriented towards the design of compact copy machines in which the distance between the image plane and object plane is small. For example, U.S. Pat. No. 4,331,380 addresses the scrambling problem by using tilted fiber optics in conjunction with adjusting the focusing power of each fiber such that the rays originating at each pixel are focused on the image plane and the resulting images contributed by each fiber add up coherently on the image plane. U.S. Pat. No. 4,331,380 does not address the issues of objects or images located at, or close to infinity.

Non-Unity Gain, Curved Transflectors With Slanted Pixels

Figure 5:
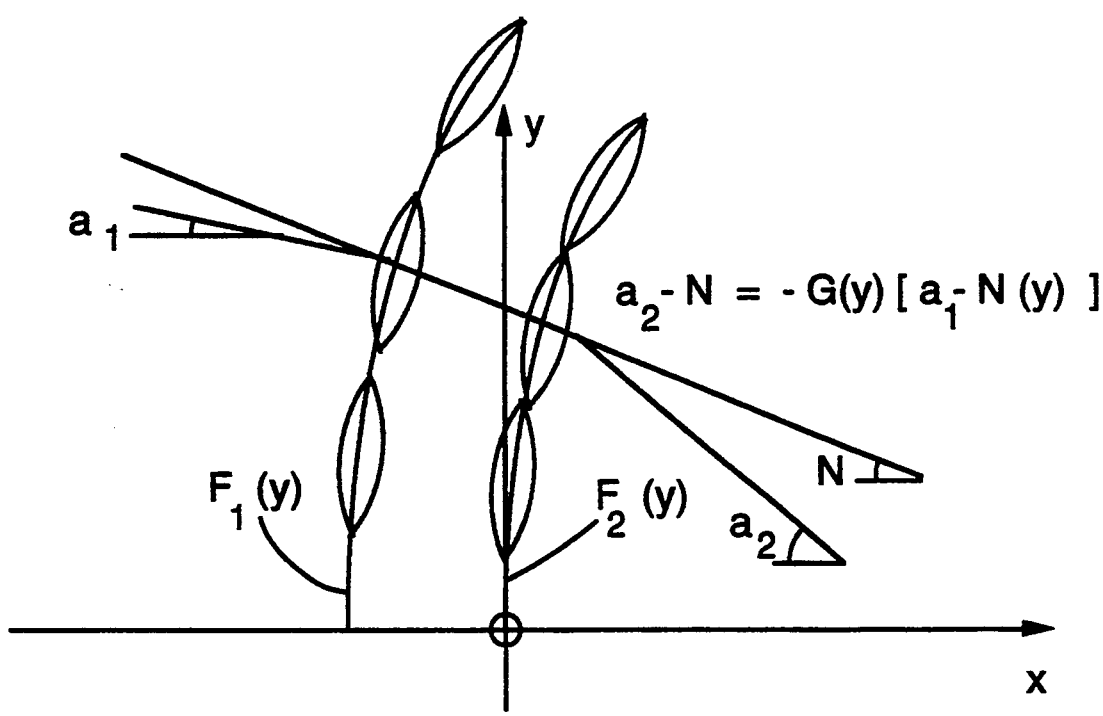
FIG. 5 shows the generalized transflector relation.

Several parameters can be adjusted to allow transflectors to have a wide diversity of properties. These parameters can remain constant from pixel to pixel or may vary. Considering a transflector located at the origin of an x y coordinate system such that the transflector optical axis follows the x direction as shown in FIG. 5. The transflector parameters include the following:
1) the gain of each pixel $G(y)$
2) the pixel slant angle $N(y)$
3) the functions $x = F_1(y)$ and $x = F_2(y)$ describing the shape and curvature for both transflector surfaces. These functions describe a curvature that may be convex, concave or flat.

These functions can be used to formulated the generalized transflector relation which relates the output ray angle $a_2$ to the input ray angle $a_1$ as a function of the transflector parameters:

$$a_2 - N(y) = -G(y)(a_1 - N(y))$$

A few design examples shall be provided in this patent to illustrate the use of these parameters.

Transflectors comprising of arrays of lenses with different focal lengths ($f_1 \neq f_2$) can be used to construct windows and mirrors that magnify or reduce. Such transflectors that use no phototropic layer are generic components for applications such as planar telescopes, microscopes, cameras and projectors. As already mentioned these devices are described in a companion patent.

These principles may also be used to construct magnifying or reducing windows and mirrors that include a phototropic layer and which therefore are smart. Devices derived from smart transflectors are discussed in this patent.

Smart Transflectors

Transflectors can be used not only as spatial light filters but also as spectral filters. In general they can control light that passes through them in what appears to be an intelligent manner by incorporating various materials between the array of lenses. I call such transflectors, "smart transflectors." As shown in FIG. 1A and 1B, smart transflectors incorporate in the focal plane between the two component lens array 1 and 2, a layer 5 sensitive to, and capable of controlling light going through it. Henceforth, we shall name this layer, the "smart layer." The smart layer may be composed of a single material or a layered or assembly of different materials. It can have any of a diversity of optical properties. For example, it may be photochromic i.e., increase its absorptivity to light as a function of the light intensity falling on it. In such case, rays originating from bright objects create absorbing spots on it. As a result, bright rays self attenuate. Dim rays go through the layer unaffected. In FIG. 1B the sun is focused on the smart layer and render the smart layer more absorptive only at the point where the sun is focused 6. As a result, only sunrays are attenuated and other rays go through. A viewer can see an airplane 7 through the transflector without being blinded by the sun's rays.

Smart Windows

The term "smart window" has already been used in the literature to describe windows coated with an electrochromic material ["Electrochromic coating for smart windows by Svensson and Granqvist, SPIE Vol 502 Optical Materials Technology for Energy Efficient and Solar Energy Conversion III 1984]. These smart windows are spectral filters only and they do not make use of geometrical devices such as microlens arrays. Here, I shall use the term smart windows to call generalized spectral/spatial filters capable of filtering light not just according to the light intensity or to an applied voltage as the prior art describes, but also according to the direction that the light is coming from.

Figure 6:
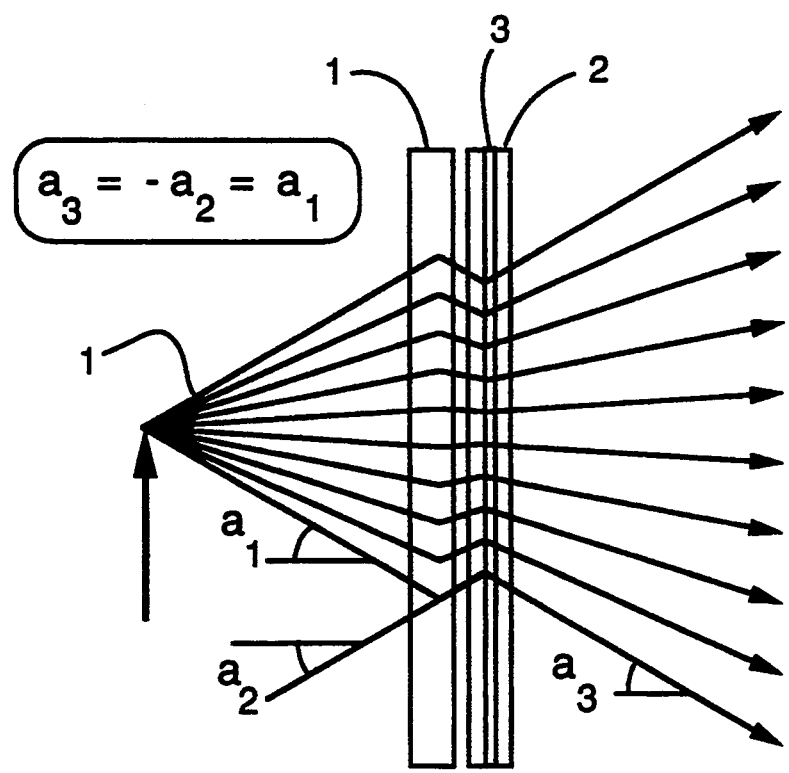
FIG. 6 describes a smart window.

A smart window is a structure comprised of the elements shown in FIGS. 6: two transflectors 1 and 2 placed back to back. As per Corollary 4, the outgoing rays are approximately colinear with the incoming rays (a2=a1). In a smart window, at least one of the transflectors 2 is smart. If, for example, the smart layer 3 increases its absorptivity as a function of the light intensity, then the smart window attenuates bright objects without affecting dim ones. An observer using a smart window can then look at objects near the sun without being blinded. Depending on the function of the smart layer and transflector optical parameters, smart windows can be used to build devices such as laser goggles, nuclear goggles, sun visors, windshields, ultraviolet vision goggles (converts ultraviolet to visible), and space suit helmet visors. Vignetting problems can be eased by fabricating the smart window with a spherical curvature centered at the observer. This approach can in principle widen the field of view to $4\pi$ steradians. Vignetting can also be improved by means of masks, slanted pixels and microprisms. These topics shall be discussed under "Distortions And Aberrations."

Like smart transflectors, smart windows can be constructed with a gain other than unity.

Smart Mirrors

Figure 7A:
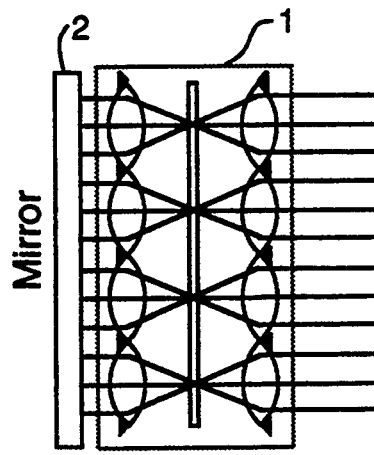
FIG. 7A provides a detailed view of a smart mirror.
Figure 7B:
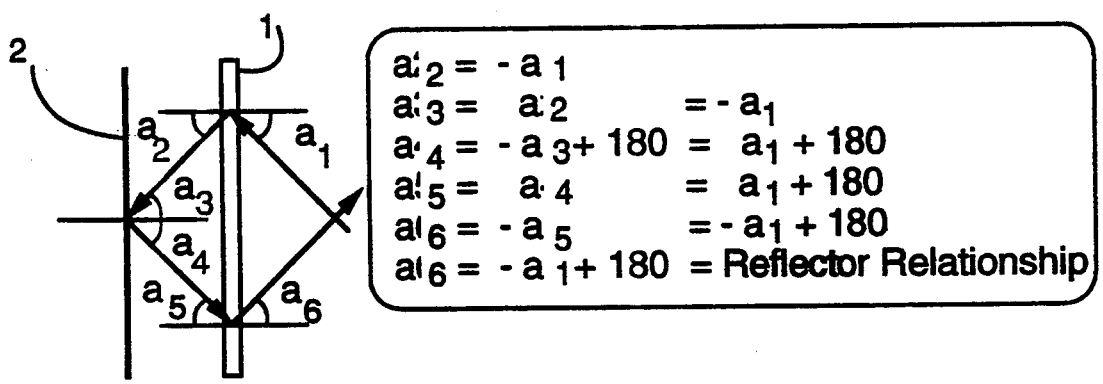
FIG. 7B describes the angular relationships between the rays interacting in a smart mirror.
Figure 7C:
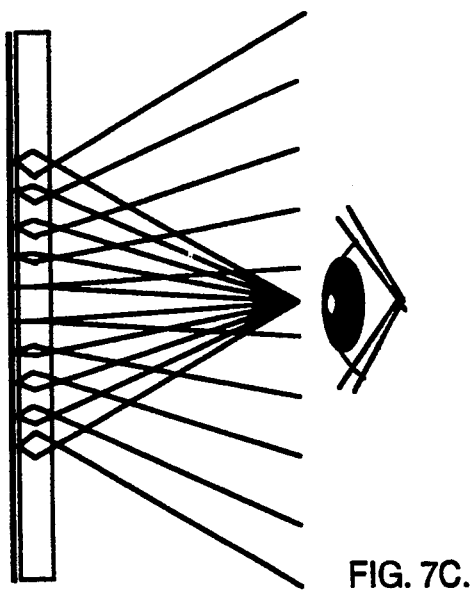
FIG. 7C provides a large scale view and functionality of a smart mirror.

The appellation "smart mirror" is the name I give to the optical structure shown in FIG. 7A through 7C. This structure is comprised of a smart transflector 1 and mirror 2 combination that effectively folds the structure in FIG. 6. The window design is "folded" by replacing the back transflector by a mirror. The presence of a smart transflector allows editing of the image by the smart layer to implement, for example, the attenuation of rays originating from bright objects.

The angular relationships between the beams is shown in FIG. 7B. An incident ray enters the transflector 1 at angle $a_1$. The ray is deflected to angle $a_2 = -a_1$. The beam then strikes a mirror 2 at angle $a_3 = a_2 = -a_1$. The beam is then reflected by the mirror at angle $a_4 = 180 - a_3 = 180 + a_1$. The beam then reenters the transflector at angle $a_5 = a_4 = 180 + a_1$ and exits at angle $a_6 = -a_5 = 180 - a_1$.

FIG. 7C illustrates the similarity between a transflector-based mirror and a normal mirror.

Construction of a Smart Transflector

Figure 8A:
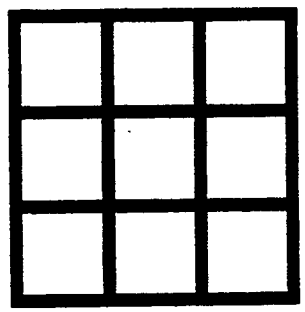
FIG. 8A shows a square arrangement of lenses for a transflector.
Figure 8B:
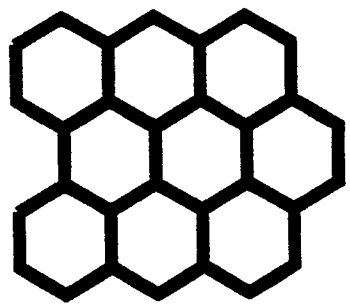
FIG. 8B describes a hexagonal arrangement of lenses for a transflector.

The lenses in a transflector can be arranged in any regular formation such as the square or a hexagonal pattern shown if FIG. 8A and FIG. 8B respectively. Many other patterns are possible.

Lens arrays comprised of a transflector can be built according to several optical paradigms currently used in industry.

Figure 9A:
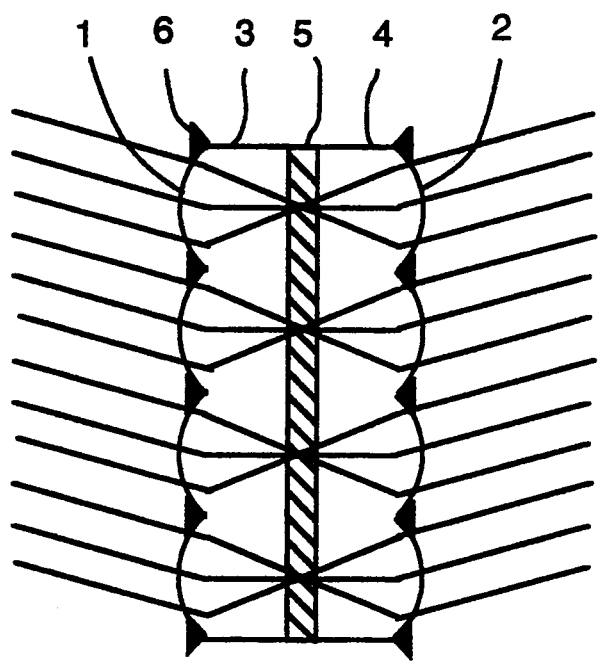
FIG. 9A shows a single pixel of a smart transflector built of microlenses.

The simplest and most conventional method of fabricating a transflector is to use geometric (conventional) optic: the shape of the surface of the optical material controls the paths of the light rays. FIG. 9A shows a smart transflector comprised of two lens arrays 1 and 2 fabricated on the side of two monolithic slabs 3 and 4 of transparent material such as glass or plastic. The slabs are cemented on either side of a smart layer 5. An antivignetting mask 6 can be added to the assembly.

Figure 9B:
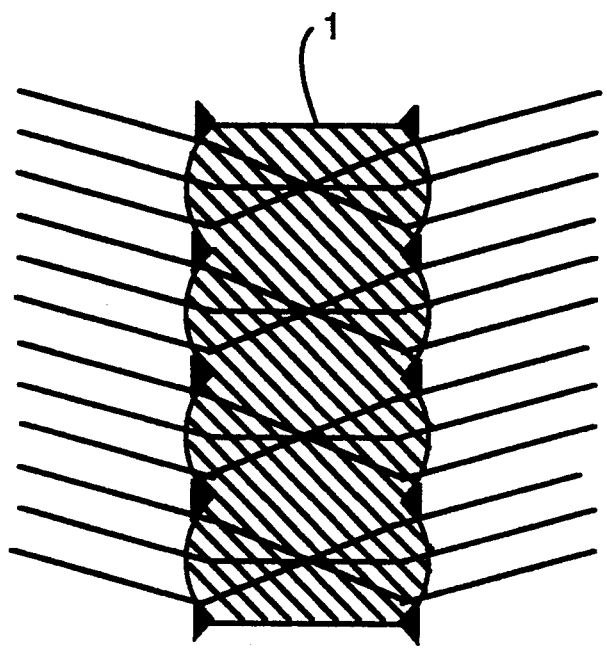
FIG. 9B illustrates a smart transflector with the light controlling material distributed throughout the optical material.

FIG. 9B shows that the light controlling layer can be distributed within the bulk of a single slab 1 of transparent material. This approach simplifies manufacturing but reduces the optical quality of the device: The spots caused by bright objects are not in sharp focus any more on the smart layer and other objects near the bright objects may be masked by the extended dark spots. However, such a device may satisfy the price performance ratio in some applications such as energy conservation panels for windows, designed to selectively filter out the sun.

Figure 10:
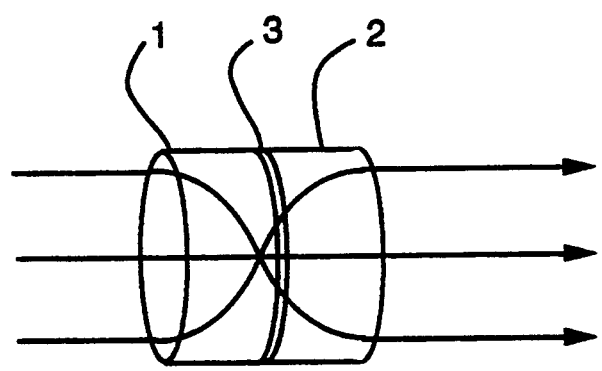
FIG. 10 describes a single pixel of a transflector using a gradient index technique.

Gradient index (GRIN) or Distributed Index (DI) technique described by Kapron, Rees, Borelli et al., provides another approach to constructing transflectors. FIG. 10 shows one single pixel of such a transflector. A graded-index lens is a glass cylinder with an index of refraction that varies as a function of the radial distance from its axis. The gradual variation of the index of refraction in the lens radial direction is used to bend the light rays. These lenses can take the shape either of flat cylindrical slabs, or assemblies of rods or fibers. GRIN lenses with parabolic index profile can be used to simulate conventional optics. [Fundamentals of Photonics by Saleh and Teich, Wiley Interscience, 1991]. When a parabolic index profile is used, light rays follow a sinusoidal trace through the rod. This path is expressed by $$x = x \cos(gz) + (x'_i/g) \sin(gz)$$

where $x_i$ and $x'_i$ are the incident ray position and slope, z is the propagation distance and g is a focusing constant expressing the gradient index. The periodicity pitch of the trace is $$L_p = 2\pi/g$$

Depending on the length of the rod, one can achieve various effects. If the rod is cut into a length $L_p/4$, the segment acts as convex lens. If the rod is cut into a length $L_p/2$, the segment acts as one single transflector pixel of unity gain.

GRIN technology can also be used to construct smart transflectors. FIG. 10 shows a single pixel of a smart transflector having unity gain, and is comprised of two arrays of $L_p/4$ long rods 1 and 2 arranged in a sandwich with a smart layer 3 inserted in the focal plane between them.

Fabrication techniques for GRIN optics devices are well known and include selective diffusion of a dopant into a planar substrate through a mask. [Encyclopedia of Lasers and Optical Technology, R. A. Meyers Ed.].

Another type of lens, holographic lenses make use of variation in the index of refraction of a medium and as such, are closely related to the gradient index lenses.

Stacking Transflectors Together

Figure 11A:
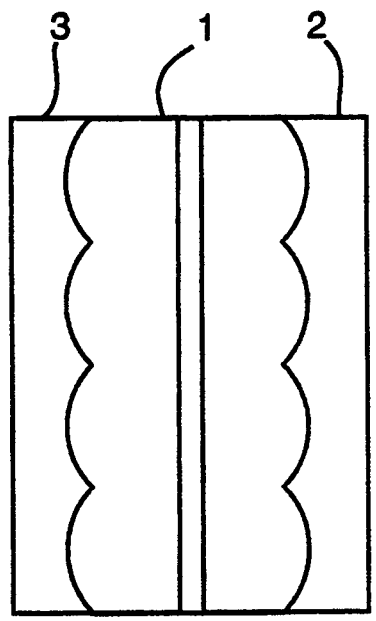
FIG. 11A shows a transflector made with a material having a high index of refraction, embedded in a material having a low index of refraction.
Figure 11B:
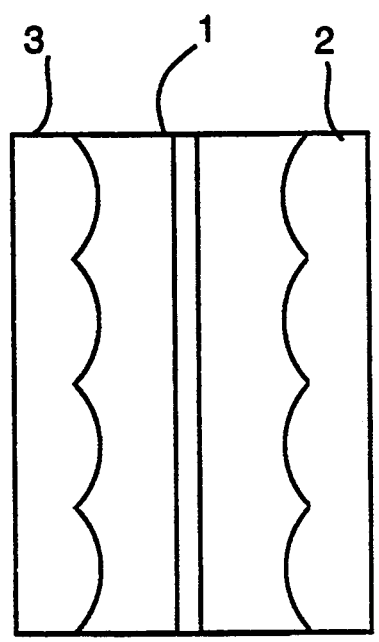
FIG. 11B shows a transflector made with a material having a low index of refraction, embedded in a material having a high index of refraction.

Unlike GRIN-based microlenses, classical microlenses (based on geometric optic), lose their lens action when some material touches their surfaces. It is essential that the surfaces in contact be flat. [Encyclopedia of Lasers and Optical Technology, R. A. Meyers Ed. Academic Press, 1991, page 283]. Transflectors using classical lenses or microlenses can be embedded in a layer composed of material with a different index of refraction. In general, the focusing power of a transflector lens can be controlled by changing the curvature of the microlenses or by changing the index of refraction of the embedding material. FIG. 11A shows a transflector 1 with a high index of refraction embedded in a transparent matrix 2 and 3 with a low degree of refraction. FIG. 11B shows a transflector 1 with a low degree of refraction embedded in a matrix with a high index of refraction 2 and 3 resulting in the reversal of the lenses curvature. The use of different indexes of refraction for the transflector and the embedding matrix provides a means for 1) controlling the focusing power of the said transflector lenses in conjunction with the lens curvature,
2) allowing the transflectors to be stacked without having curved surfaces touch each others, and
3) protecting the transflector structure.

External surfaces of course, are in contact with the external media such as air, water or vacuum, which can be considered as the embedding material. The use of a gas or vacuum as an "embedding" medium can have a significant advantage if thermal insulation is an issue. In such a case special means (i.e., spacers) must be taken to insure that they do not come in contact with each other. Spacers can also serve in partially eliminating vignetting. This design option has the advantage of providing a thermally insulating layer (air, other gas or vacuum) and is suitable in applications such as energy conservation windows.

GRIN technology is well suited for producing components that can be stacked together and can be used to produce non-unity-gain transflectors. FIG. 12 illustrates one single element of such a transflector. Rods 1 and 2 with an identical gradient function, are cut in the required lengths to achieve the desired focusing power. They are then assembled in sheets and these sheets are stacked with transparent sheets 3 made of uniform index material. Smart transflectors incorporate a smart layer 4 in the focal plane. The effect is to produce transflector pixels with a gain that may equal or differ from unity. Antireflection coatings can be added as needed, between the sheets.

Figure 12A:
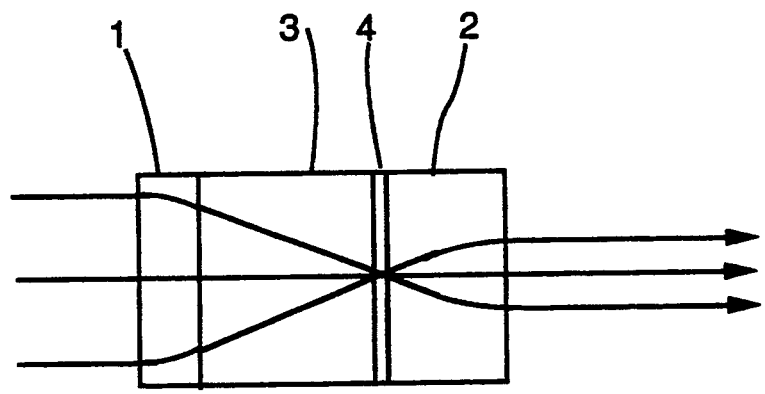
FIG. 12A describes a pixel using gradient index technology for a non-unity gain three-layer transflector.
Figure 12B:
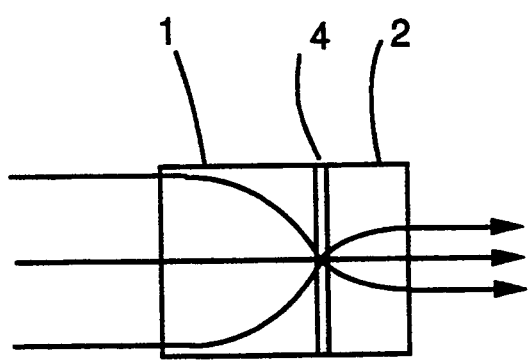
FIG. 12B presents a pixel using gradient index technology for a non-unity gain two-layer transflector.

The middle layer 3 in FIG. 12A can be eliminated from the transflector as shown in FIG. 12B, thus reducing the number of optical surfaces in the device. In FIG. 12B layer 1 has a low index gradient and is of length approximately equal to one quarter of the periodicity pitch Lp for that index; the second layer has a high index gradient and is also of length $L_p/4$ for that index. the difference in the index gradient between the two rods causes the quantity $L_p/4$ to be smaller for the high gradient rod an larger for the low gradient rod.

Less aberration and distortion can be obtained by using lenses with aspherical geometries, and compound lenses constructed by stacking and aligning several layers of materials with different indexes of refraction. These topics shall be discussed in the following sections.

Construction of a Smart Window

Figure 13A:
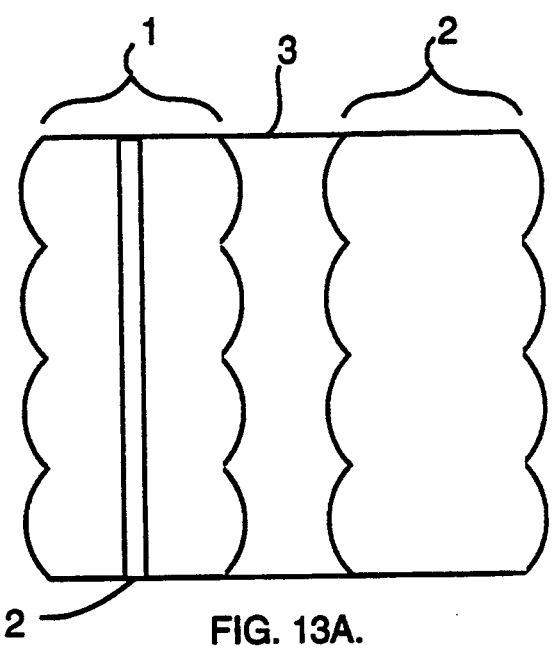
FIG. 13A illustrates the construction of a smart window using microlenses based on conventional geometric optics.

A smart window can easily be constructed by stacking together two transflectors, one of which at least, must be smart. All the stacking techniques previously discussed are applicable. FIG. 13A shows a conventional optics implementation. The transflectors, 1 and 2, are embedded in a material 3 which has a different index of refractions to achieve a non-unity gain.

Figure 13B:
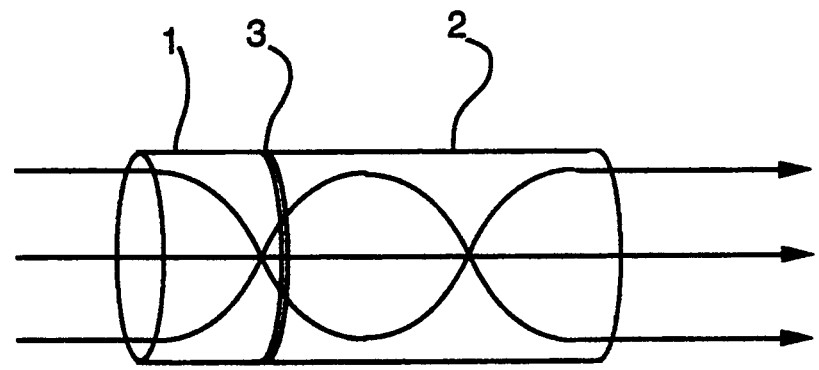
FIG. 13B shows the construction of a single element of a smart window using gradient index techniques.

GRIN optics can also be used to build smart windows. Transflectors constructed with GRIN technology have inherently smooth surfaces and can be stacked together very naturally. FIG. 13B shows one single pixel for such a window. When two transflectors are joined together to form a window, the lenses of the first transflector can be merged or "regrouped" with those lenses of the second transflector that they are in contact with, to form continuous rod lenses with a focusing power equal to the sum of the component lenses focusing power. This results in the elimination of two optical surfaces. "Regrouping" the lenses results in a three layer pixel structure:

1) an array of Lphd p/4 long rod lenses 1,
2) an array of $3L_p/4$ long rod lenses 2
3) a smart layer 3 inserted between arrays 1 and 2

The phototropic material can also be distributed throughout the rod lens material instead of being concentrated at the smart layer. This design has the advantage that only one single layer of rod lenses is needed and lower manufacturing cost. However, as mentioned earlier, performance suffers. If the smart material is photochromic, dim objects located close to bright ones will also be attenuated.

Figure 13C:
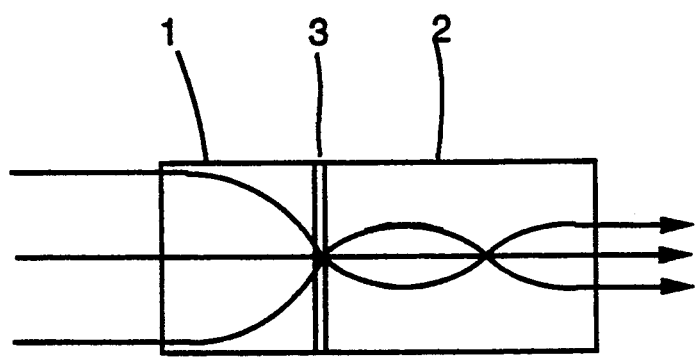
FIG. 13C describes the construction of a single element of a smart window with non-unity gain, using the gradient index technique in which only one transflector contributes to the gain.

FIG. 13C illustrates how non-unity gain smart windows can be built by using GRIN rod lenses with different index gradient. Rod lens 1 has a low gradient and rod lens 2, a high gradient. The smart layer 3 is inserted between the lenses.

Figure 13D:
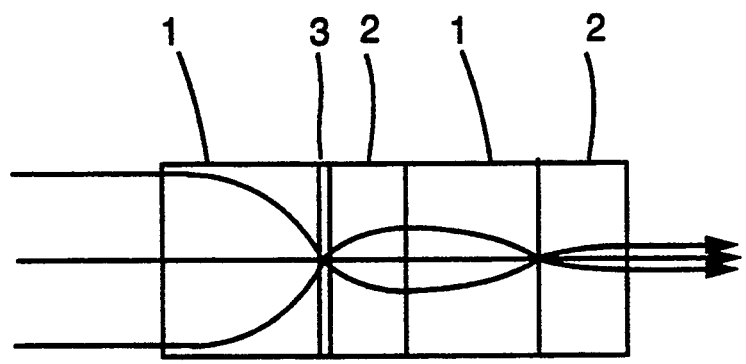
FIG. 13D illustrates the construction of a single element of a smart window with non-unity gain, using the gradient index technique in which both transflectors contribute to the gain.

FIG. 13D shows a pixel of a smart window in which each component transflector contributes to the overall gain. One of the transflector at least, must be smart. In this case, the first transflector only includes a smart layer 3.

Construction of a Smart Mirror

Figure 14A:
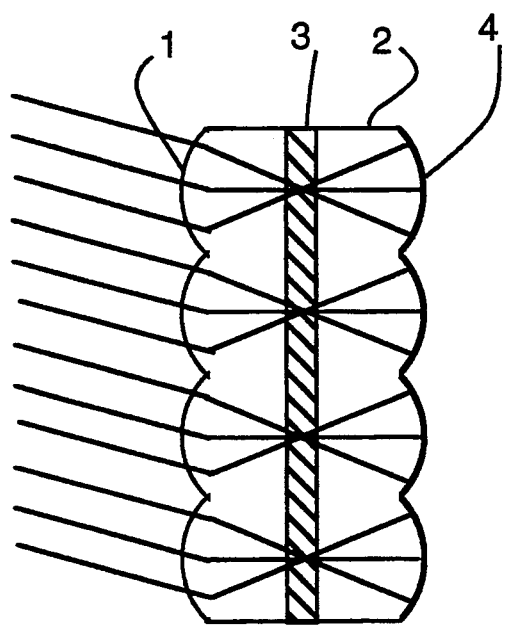
FIG. 14A shows a cross section of a smart mirror with concave reflector array.

Smart mirrors can also be built using either geometric optics or GRIN technology. The basic smart mirror design shown in FIGS. 7A and 7C can be implemented with conventional optics as shown in FIG. 14A. A single transflector is used and its back face is coated with a reflective layer 4. The effect is identical to the one obtained in FIG. 7A and 7C. The lens curvatures are designed such that the power $f_1^{-1}$ of the front lenses is equal to half the power $f_2^{-1}$ of the back concave reflectors. The design of the lenses is governed by refractive optics; the design of the reflectors, by reflective optics. Thus the shape of the front army is not identical to the shape of the back reflectors. For example, using simple thin lens relationships, the power of the front lens is equal to:

$$f_1^{-1} = (\mu - 1)(r_1^{-1})$$

where $\mu$ = index of refraction of optical material
$f_1$ = focal length of front lens $r_1$ = radius of curvature of front lens The power of the back concave reflector is given by:

$$f_2^{-1} = 2r_2^{-1}$$

Where $f_2^{-1}$ = power of concave reflector $r_2^{-1}$ = radius of curvature of concave reflector Since we must have $2f_1^{-1} = f_2^{-1}$ for a transflector, we can deduce that $$(\mu - 1)r_1^{-1} = r_2^{-1}$$

Aspherical optical formulation can be used to provide a wider field of view, less aberration and a more compact system than the thin lens model.

Figure 14B:
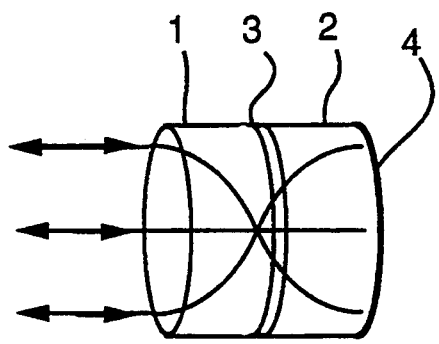
FIG. 14B describes a single element of a smart mirror using a gradient index technique.

GRIN technology can also be used to construct a smart mirror. FIG. 14B shows one single pixel of such an implementation. The front and back layers 1 and 2 respectively are each comprised of an array of $L_p/4$ long rod lenses. The two layers are arranged in a sandwich with a smart layer 3 inserted in the focal plane between them. The back layer is coated on its back side by a flat reflective film 4.

As already mentioned, the phototropic material can be distributed throughout the transflector material of the mirror with a corresponding lowering of the performance.

The Smart Layer

The smart layer is a light transmissive planar device that modulates some characteristics of light such as intensity, polarization, phase, frequency and direction. This layer shares some properties with planar devices widely known in the industry as Spatial Light Modulators (SLMs), Optically Addressed Spatial Light Modulators (OASLMs), Self-Electro-Optic-Effect Devices (SEEDs) and photochromic glasses. It should preferably have two key properties:

1) The smart layer should, in some way, be sensitive to light. Chemical or electronic states in the layer must be affected by the local variations of the light intensity over the smart layer. These states, in turn, must affect the layer optical properties such as absorptivity, transmissivity, reflectivity, scattering, refractivity, birefringence and optical activity.

and

2a) It should be capable of controlling light. In other words, the states of the layer must affect some property of light such as intensity, wavelength, polarization, and phase. The polarity of the input change may be identical or opposite to the polarity of the output change. For example, an increase in light intensity may lead to an increase or a decrease in absorptivity, which may lead respectively to a decrease or an increase in the transmitted light.

or

2b) It must be capable of amplifying light according to its internal states. This includes effects such as photomultiplication and light amplification and stimulation (laser).

or

2c) It must be capable of shifting light frequency according to its internal states. The process may include fluorescence, phosphorescence and other light emitting processes such as Raman scattering and other nonlinear processes.

The smart layer may also have a third property useful in applications requiring a wide dynamic range. Its sensitivity to light may be controllable by means of an applied field such as an electric field. This property is important in cases requiring a wide dynamic range. An example illustrating the ability of electrically controlling sensitivity shall be discusses below in the context of the modified Hughes light valve, the microchannel plate and the SEED.

There exist a range of technologies that can provide a wide selection for the transmission function of the smart layer [Optical Computer Architecture by A. D. McAulay, John Wiley and Sons, Inc, 1991]. Depending on how the smart layer is built, many different effects can be attained. The layer can consist of a single nonlinear optical material or of a complex structure consisting of smaller layers with different but complementary functions.

Phototropic Materials

The characteristics of lights that the material could be sensitive to and/or control include intensity, polarization, frequency (ultraviolet, visible, infrared). Smart layers use chemicals that change their optical and/or electrical properties (such as absorptivity, transmissivity, refractivity, conductivity) as a function of the intensity of the incident light, and possibly as a function of an input electric field or current. These materials include but are not limited to photochromic glasses, semiconductors such as Gallium Arsenide (GaAs), ceramics such as Lead Lanthanum Zirconium Titanium (PLZT), Liquid Crystals such as a nematic or smectic crystals, organics such as 3,4,9,10,perylenetetracarboxylic dianhydride (PTCDA), phthallocyanine, quinones and antiquinones, and crystals such as fullerenes. These materials also include substances that fluoresce or that emit at a frequency different than the illuminating frequency. These materials also include electrochromic substances doped with electron donor molecules and electron acceptor molecules as described in U.S. Pat. No. 5,062,693 by Beratan and Perry.

Smart Layer Using Thermochromic Materials

Thermochromic materials such as Gallium Arsenide (GaAs), GaAs alloys and Germanium (Ge) have been used in U.S. Pat. Nos. 3,714,430 by Finvoid et al and in U.S. Pat. No. 3,020,406 by Whitney. However these patents do not make use of microlenses or of the transflector concept. The utilization of heat to effect a change in the absorption of light in materials requires a significant change in temperature in the smart layer. As the dimensions of the transflector elements decrease, heat conduction effects become more pronounced and reduce the ability to sustain localized elevated temperatures. Thermochromic materials can be used in the construction of smart layers but limit how small transflector dimensions can be. This issue will be discussed below under the topic "Thermal limits and dynamics."

Smart Layer Using Photochromic Glass

A smart layer can be simply implemented as a homogeneous layer of photochromic glass. Typically such glass is made with a base glass mixture to which are added a large amount of boric oxide, silver and copper in the form of nitrates or chlorides and a metal halide. As the glass cools from a molten state of 1200 degrees, the halogen reacts with the silver and copper to produce silver halide and a small amount of copper halide. Reheating the glass to lower temperature hastens the precipitation of small particles containing silver and copper halide. When exposed to radiation, the silver ions in these particles gain an electron from copper ions and become neutral silver atoms. They cluster into small silver specks which absorb light and cause the glass to turn darker. Specks are formed in many sizes and shapes; their absorptivity to light covers a wide spectrum.

Typical photochromic glass requires a few seconds or minutes to become dark (it increases its absorptivity) when exposed to ultraviolet light. This property makes photochromic glass sensitive to sunlight and suitable as a component for smart windows designed for filtering sunlight in housing applications.

Smart Layer Using Photochromic Organics

Many organic materials exhibit photochromic properties, for example spiropyrans, spirooaxines and fulgides. Organic photochemicals display a variety of properties. Their greatest advantage compared to photochromic glasses is their speed and sensitivity. Their greatest drawback, however, is their susceptibility to fatigue. Spiropyrans can have a sensitivity of down to 100 $\mu$Joules/cm$^2$ (Photochromism, Molecules and Systems, H. Durr and H. Bouas-Laurent Eds, Elsevier).

Smart Layers Using Combinations of Absorbing Dyes

Many organic chemicals such as 3,4,9,10, perylenetetracarboxylic dianhydride (PTCDA) exhibit large non-linear optical effects. These materials are very fast (in the nano or femtosecond range). Using techniques of molecular engineering, various molecular assemblies and mixtures may be created, with properties of light sensitivity and control, tailored to the specific application. [Ersen, Ali, Laser recrystallized Si/PLZT smart spatial light modulators for optoelectronics computing, Dissertation, UCSD 1992, page 19]

Smart Layers Using Photoinduced Electron Transfer Chemicals

A technique is described in U.S. Pat. No. 5,062,693 by Beratan and Perry, for generating phototropic chemicals, based on an electron transfer mechanism between donor molecules and acceptor molecules. These chemical pairs can be designed with customized optical properties such as photochromism and optical activity and can be used as dopants in a matrix comprised of the smart layers. When excited by light, the molecular system changes state temporarily and reversibly. The optical properties of the excited state differ from those of the ground state. The molecular system then decays back to its ground state thus restoring the system back to its original optical properties. The number of chemical pairs capable of this behavior is significant. Well studied donor molecules include ruthenium trisbipyridyl and phthallocyanine. Acceptor molecules include methyl viologen. These chemicals would typically be embedded in some transparent matrix material. Methods of forming these chemicals in thin sheets or films is discussed in said patent.

Smart Layer Using Electrochromic Materials and Photoconductive Materials

Figure 15:
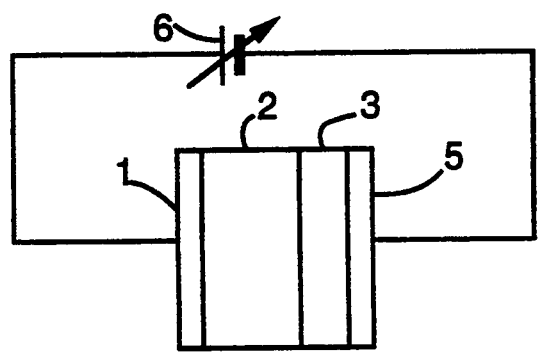
FIG. 15 illustrates a smart window using an electrochromic material in combination with a photoconductive layer.

Electrochromic materials coupled with photoconductive materials can be used as components in a smart layer that changes its absorptivity as a function of light intensity [Photochromism by G. Brown Ed., Wiley Interscience, page 662]. Detail design of such layers is well known (Benson et al, Solid State Electrochromic Switchable Window Glazing, SPIE Vol 502, Optical Materials Technology for Energy Efficient and Solar Energy Conversion III 1984). As shown in FIG. 15, the smart layer is comprised of a sandwich of four layers:

1) a transparent electrode layer 1, composed of a material such as Indium Tin Oxide (ITO),
2) a photoconductive layer 2, such as hydrogenated amorphous silicon (a-Si:H) or a hydrogenated amorphous silicongermanium alloy. (S. K. Deb, Current status of photovoltaic research at SERI, SPIE Volume 692, Materials and Optics for Solar Energy Conversion). Many other photoconductive material exist as is well known to people versed in this art.
3) an electrochromic layer 3. Several chemicals can be used. One of the best know is Tungsten Oxide ($WO_3$) used in combination with the ionic conductor Magnesium Fluoride ($MgF_2$). In this arrangement, the electrochromic layer is actually two layers: a layer of $WO_3$ deposited on top of a layer of $MgF_2$).
4) a transparent electrode layer 4 of ITO.

Under normal operation, a voltage is applied across the transparent electrodes and an electric field develops across the smart layer. When the device is exposed to light, the photoconductive material becomes conductive in proportion to the intensity of the incident light. As a result, a spatial pattern of conductance is formed in the photoconducting layer. This effect alters the electric field across the electrochromic layer which changes color as a function of the local light intensity and of the voltage across the device.

An advantage that this system has over the previously explained photochromic glass approach, is that the selective attenuation effect of bright rays, can be controlled by adjusting the voltage level 5 across the smart layer. This capability is important in providing smart windows and smart mirrors with the ability to be turned on and off, and to operate in a wide dynamic environment.

Smart Layer Using Optically Active and Photoconductive Materials

A more complex implementation uses optically active materials in conjunction with polarizers. Its construction has certain similarities with the smart layer design using electrochromic materials shown in FIG. 15. This arrangement has also a certain resemblance to the Hughes Liquid Crystal Light Valve [Photonics by Saleh and Teich Wiley Interscience, page 728] except that no mirror and optical isolator is used. The smart layer is essentially a capacitor comprised of the following sandwich:

1) A transparent electrode 1 made of material such as Indium Tin Oxide (ITO),
2) A photoconductive layer 2 made of material such as Cadmium Sulfide (CdS) or hydrogenated amorphous silicon (a-Si:H),
3) An optically active layer 3 made of a material such as a liquid crystal (LC) or a ferroelectric liquid crystal (FLC),
4) A second transparent electrode 4.

A voltage is applied across the electrodes and a charge develops across the smart layer. When exposed to light, the photoconductive material becomes conductive in proportion to the intensity of the incident light. As a result, a spatial pattern of conductance is formed in the photoconducting layer, and the electric field across the smart layer is altered in those areas where the conductance is high. In turn, the liquid crystal rotates the plane of polarization of light as an inverse function of the electric field intensity. If the device is enclosed between two crossed polarizers, bright rays can be attenuated. The polarizers can be external to the optical system that includes a smart window. The applied voltage must follow the drive requirements for liquid crystals to avoid electrolytic damage to liquid crystal molecules.

Smart Layer Using Fluorescent and Phosphorescent Materials

The smart layer can also be built of material that emits visible light when illuminated by an invisible radiation. For example, the smart layer could include Zinc Sulfide [Photonics by Saleh and Teich, Wiley-Interscience, 1991, Page 456] which fluoresces with visible light when irradiated with ultraviolet light. This technique allows the construction of goggles capable of seeing invisible radiation such as ultraviolet light while providing the viewer with a three dimensional perspective.

Smart Layer Using Microchannel Plates

Figure 16A:
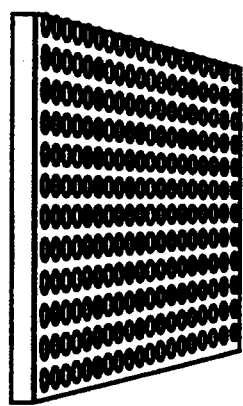
FIG. 16A describes a microchannel plate to be used in the smart layer.
Figure 16B:
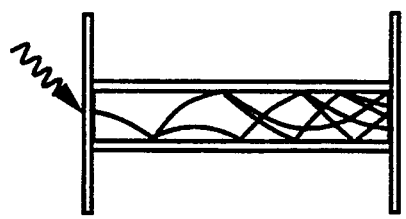
FIG. 16B illustrates a single microchannel tube.

Very weak light signals can be amplified using a microchannel plate. This technique can also be used to convert invisible electromagnetic radiation such as infrared, or ultraviolet into the visible spectrum and still provide three dimensional vision. Microchannel technology [Photonics by Saleh and Teich, Wiley-Interscience pages 646, 647] is an established technology and a short summary shall be presented. A microchannel plate (FIG. 16A) is comprised of millions of capillaries measuring about 10 μm in internal diameter. The size of the microchannels is in general much smaller than a transflector pixel such that a large number of microchannels can fit within one single pixel. In effect, the microchannel size corresponds to the transflector granularity resolution. The interior walls of each capillary (FIG. 16B) are coated with secondary-electron-emissive material. The capillaries are stacked in a glass plate of thickness of about 1 mm. The front side of the plate is coated with thin transparent metal film and the back side with an electrically conductive phosphor coating. A voltage is applied across the plate. When the plate is exposed to light, photons collide with the front electrodes which emit photoelectrons. These are accelerated and collide with the walls of the microtubes where several secondary electrons are emitted. This multiplication process is repeated many times as the electrons cascade. The microtubes behave as continuous dynodes, multiplying the photoelectron current emitted by the front metal cathode. The electrons then hit the phosphor anode which becomes luminescent. When this device is used as a smart layer in a transflector, it must be placed such that the front surface is at the focal plane of the transflector front lens array, and the back surface, at the focal plane of the transflector back lens array. This approach has, like the previously discussed methods using photoconductive materials with either electrochromic or optically active materials, the capability to adjust the gain by controlling the voltage across the microchannel plate. This technique can provide smart windows and smart mirrors with an extremely wide dynamic and spectral range. This capability is important in applications where ambient light should be amplified such as goggles or visors for night time operation.

Smart Layers Using Self-Electro-Optic-Effect Device (SEED)

Another well known class of devices, SEED [Optical Computing by Dror Feitelson, The MIT Press, pages 153, 154] can be used to construct the smart layer. The SEED is a quantum well device comprised of a number (e.g., 100) of a few nanometer (e.g. one to ten) thick layers alternating between Gallium Arsenide (GaAs) and Aluminum Gallium Arsenide. (These kind of structures can be grown by techniques such as Molecular Beam Epitaxy or Metal Organic Chemical Vapor Deposition). Electrons and holes are confined within the GaAs layers and surrounded by the AlGaAs layers. They behave as if they were in a box and can acquire only quantized energy levels. When a voltage V is applied across the layers, the electrons and holes move to opposite sides of the potential well resulting in a lowering of the electron/hole pair energy and consequently, to a decrease in absorptivity A(V) of the system to light. But the voltage V is dependant on the local optical intensity I since the light absorbed by the material creates charge carriers which alter the conductance. The absorptivity of the device increases with light intensity, which allows bright rays to be selectively attenuated. The SEED technique also allows the dynamic range of operation to be extended by controlling the voltage across the smart layer. SEEDs are useful in smart layers when the response time should be in the nanoseconds.

Operational Limitation

The operation of a smart transflector has some inherent and often contradictory limitations. These are:
1) pixel resolution
2) granularity of the smart layer
3) thickness of the smart layer
4) thermal limits
5) dynamics
6) vignetting
7) distortion and aberration Each one of these limitations shall be discussed.

Pixel Resolution

The performance of the transflector system is also limited by the granularity apparent to the observer because of the scrambling of the light rays within each pixel as mentioned earlier. Scrambling of the rays may becomes an issue when
1) the pixels are large and
2) the rays entering the transflector are not parallel (because the rays originate from close by objects) and
3) no unscrambling mechanism is used such as using a window structure or adjusting the pixel focus.

Under these conditions, the granularity caused by each pixel can significantly degrades the transflector angular resolution. Assuming that the observer is located at a distance r from the transflector system, then the angular resolution, $A_{pix}$, due to the transflectors pixels is equal to:

$$A_{pix} = \frac{d}{r}$$

Smart Layer Granularity Limit

For a lens element in a transflector array, of focal length f, the angular resolution $A_{gran}$ due to the size g of the grains within the smart layer can be calculated:

$$A_{gran} = \frac{g}{f}$$

This limit is particularly important for smart transflectors making use of microchannel plates. The diameter of each micro tube has an upper limit defined by $A_{gran}$.

Smart Layer Thickness Limit

The smart layer is normally positioned at the focal plane but its thickness prevents the light rays from being precisely focused. The rays are out of focus on the front and on the back surfaces. Assuming that the focal plane falls exactly in the center of the smart layer, then the light rays form a circle of confusion of diameter C on each face of the layer. For a layer of thickness $\tau$ we have the relation:

$$\frac{d}{f} = \frac{2C}{\tau}$$

from which we can calculate the thickness of the layer:

$$\tau = \frac{2fC}{d}$$

The angular resolution $A_{thick}$ defined by the thickness of the smart layer defined by:

$$A_{thick} = \frac{C}{f}$$

Hence the angular resolution $A_{thick}$ is:

$$A_{thick} = \frac{\tau d}{2f^2}$$

The efficiency of the layer in controlling light depends on its thickness and on the type of material being used. Assuming that the smart layer includes a chemical that absorbs light, then according to Lambert-Beer's law, the ratio of the number of photons p absorbed by the layer, to the total number of photons $p_0$, is exponentially related to the thickness $\tau$ of the layer, the concentration of absorbing molecules m and a constant of proportionality $\epsilon$ (absorptivity) where $\epsilon$ is a property specific to each molecule for a given light frequency. Thus for monochromatic light we get:

$$\log(p/p_0) = m\tau\epsilon$$

Therefore, the angular resolution $A_{thick}$ can be expressed as a function of the light absorption capability of the smart layer, and the concentration and optical properties of absorbing molecules:

$$A_{thick} = \frac{d \log(p/p_0)}{2m\epsilon f^2}$$

While this result is strictly valid for monochromatic light only, it can still provide a guide to the designer for wide band light.

Smart Layer Sensitivity and Speed

It can be shown that for a light source with the following characteristics corresponding for example to an automobile headlight:

P = total radiant energy emitted by the source = 10 watts radiated energy
A = Area of light source = 400 cm$^2$
$\theta$ = Angular width of light beam = $10 \times \pi/180$ radians and transflector elements described by:

d = pixel diameter = 1.0 mm
f = focal length of transflector elements = 2 mm then the energy density E received at the smart layer is $$E = Pt \frac{d^2}{4A \theta^2 f^2}$$

where t is the exposure time. For an exposure time of one millisecond the resulting energy density at the smart layer is equal to 51.29 $\mu$joules per cm$^2$. This sensitivity (ability to turn from a transparent state to an opaque state) is achievable with known phototropic materials.

Thermal Limits and Dynamics

Thermal operating limits and thermal time constants shall be calculated for a smart layer in a transflector exposed to an intense source of light such as the sun. We shall assume the following:

I = Light Intensity = Solar flux constant = 1 mw/sq.mm
S = Light Source Angle = 0.01 radians for the Sun
d = Transflector component lens aperture = 0.1 mm
f = Transflector Component lens focal length = 0.1 mm
$\tau$ = Thickness of smart layer 0.002 mm
H = Specific heat of smart layer = 0.32997 mjoules/mgm °C. for Gallium Arsenide (GaAs)
$\rho$ = Specific gravity of smart layer = 5.3 for GaAs
K = Heat conductivity of layer = 37 mwatts/°C. mm for GaAs
Q = Area of intense spot on the smart layer
M = Mass of smart layer disk covered by intense light spot
V = Volume of smart layer disk covered by intense light spot Being conservative and assuming perfect absorptivity, the radiative input power into the high intensity spot on the smart layer can be expressed as:

$$P_I = \frac{\pi d^2 I}{4}$$

Again, we shall be conservative and assume that the power lost by the high intensity spot on the smart layer is only due to conduction. This power can be approximated by assuming that heat is lost through the side of a cylinder with a base area Q equal to the area of the spot, and a length equal to the thickness $\tau$ of the layer. We shall assume that the side of the cylinder has a thickness d. For a temperature difference T, the power lost by conduction through the sides of this cylinder is:

$$P_O = \frac{KQT}{d}$$

The differential equation describing the change in temperature due to the heat flow is given by:

$$\frac{\partial T}{\partial t} = -\frac{(P_O - P_I)}{MH}$$

Since $M = Vp = Q\tau\rho$, and $Q = \pi S f \tau$ then we have $M = \pi S f \beta^2 \rho$. Therefore:

$$\frac{\partial T}{\partial t} = -\frac{K}{H\tau d\rho}T + \frac{d^2}{4Sf\tau^2 H\rho}I$$

For $\partial T/\partial t = 0$, we have the steady state temperature change:

$$T = \frac{d^3 I}{4KSf\tau}$$

The time constant for this differential equation is:

$$T.C. = \frac{\tau \rho H d}{K}$$

Assuming the numerical quantities specified above we find:
T = 3.378 ° C. (steady state increase in temperature)
T.C. = 9.453 μsec The small increase in temperature and the fast time constant is due to the small dimensions involved in this system. Obviously, a transflector incorporating microlenses should have no problem operating with the sun for any kind of material used in the smart layer and for a wide range of optical parameters. When the power densities become really high as with short pulsed lasers, thermal issues become significant. Assuming the same geometry and material as above, pulses shorter than 10 μsec or more than thirty times as intense as the sun may destroy the smart layer (depending on the materials used) unless a bandstop filter specific to the laser frequency is placed in front of the smart transflector. In such an arrangement, a high and narrow band protection is provided by the filter, against the main laser frequency, and a wide band protection is provided by the smart window, against radiation scattered at other wavelengths.

Dynamic Limitations

The dynamic limitations of a smart transflector are set by the type of material used in the smart layer. These limitations must satisfy operational requirements. Consider for example, at the lower end of the dynamics, a smart window used as a means of conserving energy in a house, by keeping the sun out without darkening the window. The operational dynamics in this case are very slow and photochromic glass with a time constant in the order of minutes is adequate for the smart layer. A more demanding dynamic environment may be a car rearview mirror which must track bright rays originating from car headlights and must operate at night and during daylight. Such a system could use a chemical pair based on electron transfer between donor and acceptor molecules. A smart layer customized to the car rearview mirror requirements can have a response time in the milliseconds and be both photochromic and electrochromic such that its sensitivity is adjusted electrically. An highly demanding dynamic system such as a nuclear explosion goggles could use a thermochromic layer and may be implemented using a semiconductor or a ceramic as the smart layer.

Vignetting

When the desired field of view is large, rays that arrive at the transflector at an angle significantly different from the normal angle, may traverse two lenses that are not face to face. This effect results in the appearance of several images. Several techniques can resolve this problem.

The first is the use of fast lenses (high d/f ratio). This approach can increase the field of view, but creates distortions and aberrations unless aspherical lenses are used.

The second method is to superimpose an antivignetting mask on top of the lens arrays. This approach has the effect of reducing the fill factor and the amount of light the lens arrays can pass. Antivignetting masks 3 have already been illustrated in FIG. 9A.

The third method of reducing vignetting is the use of spherically shaped transflectors. This approach shall be discussed later in the section on distortions and aberrations.

The fourth method of reducing vignetting uses slanted pixels. This technique shall also be discussed in the paragraph on distortions and aberrations.

The fifth method of reducing vignetting makes use of a smart layer comprising a mask. This mask would be invariant with the light intensity, and typically would remain clear in some areas and opaque in other areas. This mask would usually be identical within each pixel. It would include for example, a clear area around the pixel optical axis, and an opaque area along the outer rim of the pixel. Light transmitted by the pixel would then be angularly restricted by the mask. This approach is very efficient in restricting the field of view and reducing vignetting.

Rod lenses based on gradient optics automatically eliminate vignetting because rays with large angles with the optical axis, exit the optical fiber and are lost (James Rees, Office Application 0f Gradient-Index Optics, SPIE Vol 935 Gradient Optics And Miniature Optics 1988 page 27–51)

Distortions and Aberrations

Distortions and aberrations of transflector arrays can be reduced by using aspherical lenses. The fact that a transflector is comprised of two lens arrays provides the designer with a degree of freedom in the design of the lens profile for these two arrays for minimizing distortions and aberrations.

Three other methods reduce vignetting, distortion and aberration by shaping the transflectors rather than the lenses themselves and by using compound lens techniques.

Figure 17A:
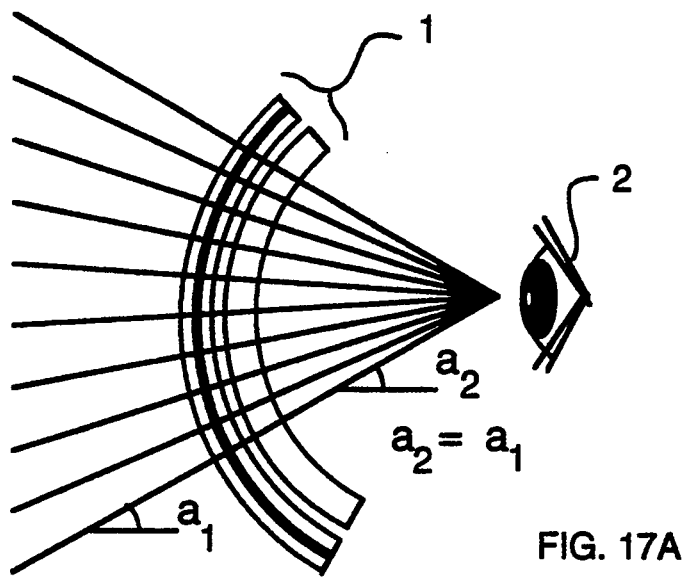
FIG. 17A illustrates spherical molding for a smart window to avoid vignetting, aberration and distortion.

The first method is shown in FIG. 17A. A smart window can be shaped in a spherical curvature 1 centered at the observer 2 to avoid vignetting of the image, or attenuation of the rays by the antivignetting mask if such a mask is present. This shape can, in principle, widen the field of view to 360 degrees ($4\pi$ steradians) without introducing any distortion or vignetting. The apertures of the lenses in the spherical transflectors may have to be scaled in proportion to their distance from the center of the sphere such that the lenses on the inner sides of the smart window have the smallest apertures and those on the outer side, the largest one. For very thin transflectors and small pixels this consideration is not significant.

Figure 17B:
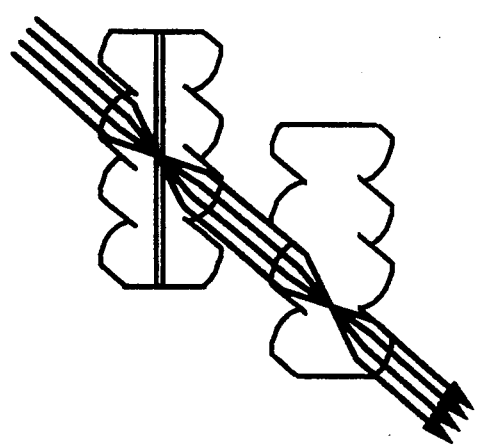
FIG. 17B shows slanted pixels to avoid vignetting, aberration and distortion.
Figure 17C:
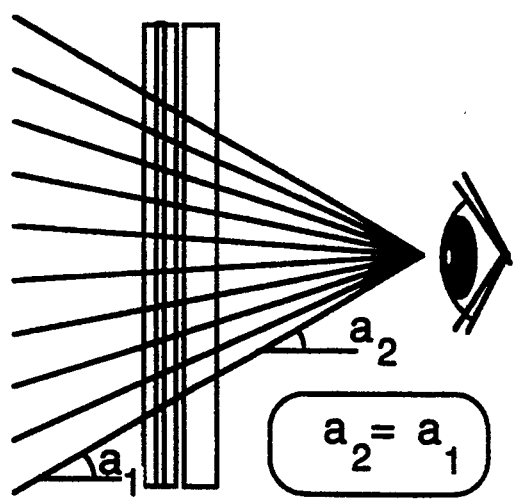
FIG. 17C demonstrates how slanted pixels can be used within a transflector structure.

The second technique is shown in FIGS. 17B and 17C. A smart window can be flat and avoid problems such as vignetting and distortion by slanting each pixel optical axis toward the observer. More precisely, this involves rotating the optical axis of each lens pair in the transflectors such that each lens axis always point toward the observer. The effect is the same as in FIG. 17A except that the smart window is flat instead of having a spherical curvature. In general, smart windows can be designed by adjusting simultaneously the shape of the window and the inclination of the lenses optical axes, to provide an optimum shape for any given application. Thus various other shapes are possible.

The third technique for reducing distortion and aberration uses compound lenses. These lenses are made by fabricating lenses in layered arrays where each layer consists of materials with different indexes of refraction. The effect at the microlens level, is identical to the construction of compound lenses. The fourth method is applicable to GRIN technology. A gradient in the index of refraction optimized for a given optical criterion such as the minimization of aberration or distortion is applied to the lens.

Embodiments

The transflector is a general purpose tool that has a wide range of applications covering smart windows and smart mirrors. Smart windows include all kinds of electromagnetic transmission devices such as house windows, car windows, sun visors, nuclear and laser goggles, and space suit helmet. Smart mirrors include rear view mirrors. The diversity of these applications is compounded by the large number of selection available for the smart layer which is critical in defining the functionality of the system. Prior art includes many smart layer designs and materials such as photochromic glasses, liquid crystal devices, and quantum well devices. Prior art also includes microlens arrays. However prior art does not include the microlens optics assembled as transflectors and magnifying windows and the combination of microlens optics and nonlinear optical materials positioned at the focal plane.

Smart House Window

Figure 18:
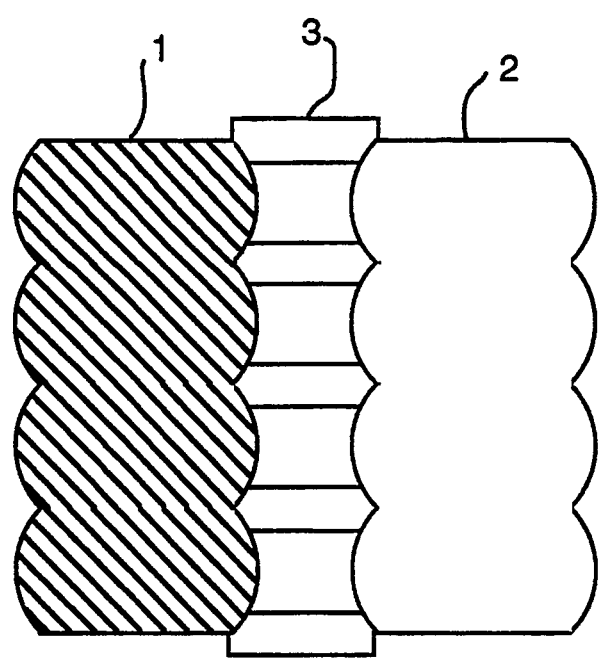
FIG. 18 describes a thermally insulating house window using a smart and a regular transflector, with the light controlling material distributed throughout the smart transflector.

A house window panel is embodied as shown in FIG. 18. It uses flat transflectors using conventional microlens technology, with normal pixels and a uniform gain. It is a sandwich comprised of the following:
1) a first layer 1 consisting of a flat transparent monolithic slab of thickness D, embossed on either side with microlenses with a focal length equal to f=D/2, and composed of a photochromic glass,
2) a second layer 2 consisting of a flat transparent monolithic slab of thickness D, embossed on either side with microlenses with a focal length equal to f=D/2, and composed of a regular clear glass,
3) An antivignetting mask 3 that also separates the first layer from the second layer and allows a layer of air or vacuum to exist between said layers.

Smart Solar Visor

Figure 19:
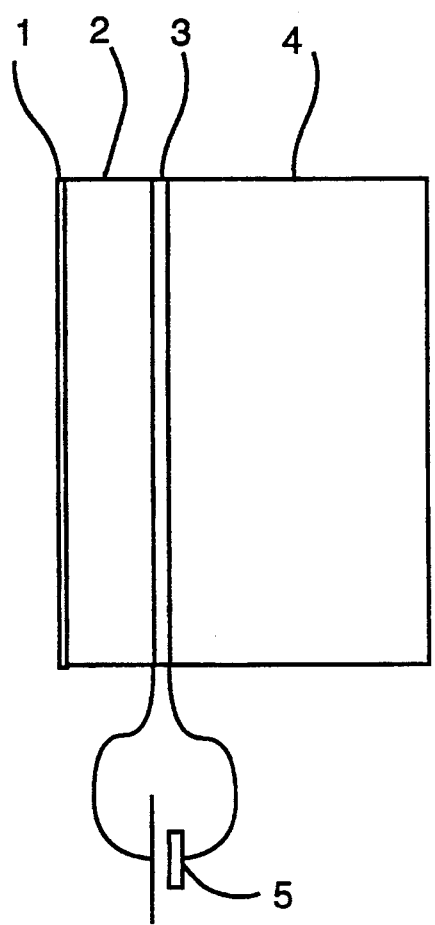
FIG. 19 shows the smart layer for a solar visor using transflectors based on a gradient technique, and having a color filter to additionally restrict the light from the sun.

A solar visor is shown in FIG. 19, that uses gradient index lenses. It is comprised of a smart window with the transflector functions merged or "regrouped" among the rod lenses as already described in FIG. 13B. The visor panel is comprised of four layers:
1) the first layer 1 is a color bandpass filter to restrict the solar spectrum to the visible band,
2) the second layer 2 is a panel of GRIN rod lenses approximately $L_p/4$ thick,
3) the third layer 3 is a smart layer using an electrochromic technique and comprised of the following:
   a) a transparent electrode layer composed of Indium Tin Oxide (ITO),
   b) a photoconductive layer composed of hydrogenated amorphous silicon (a-Si:H),
   c) an electrochromic layer composed of Tungsten Oxide ($WO_3$) deposited on top a layer of Magnesium Fluoride ($MgF_2$).
   d) a transparent electrode layer of ITO,
4) the fourth layer 4 is a panel of rod lenses approximately $3L_p/4$ thick;

A voltage 5 is applied across the electrodes and a charge develops across the electrochromic layer. Under illumination, the photoconductive layer conducts electricity as a function of the intensity of the incident light. A spatial pattern of conductance develops in the photoconducting layer, which increases the electric field in those areas where the light intensity is high. The electrical field affects the operation of the electrochromic layer which becomes opaque to intense rays, leaving dim rays unaffected. Control of the voltage provides a means of adjusting the sensitivity of the device to light.

Rear View Mirror

Figure 20:
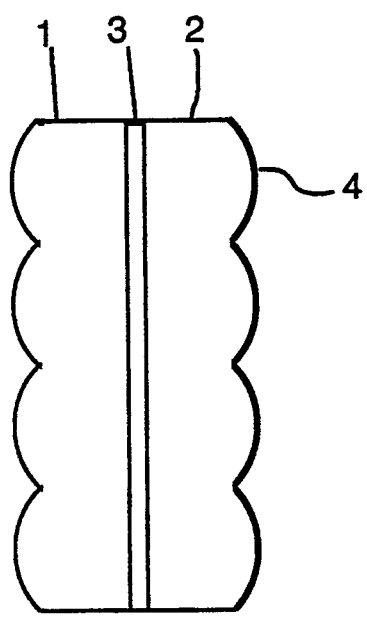
FIG. 20 illustrates a car smart rearview mirror.

The embodiment of a car rear view mirror is shown in FIG. 20. It is a smart mirror that has a flat transflector with normal pixels and that uses classical lens technology. It is comprised of four layers in a sandwich:
1) The first layer 1 is a slab with the external surface shaped in the form of microlenses of focal length f and the internal surface, flat, and joined to the second layer,
2) the second layer 3 is the smart layer and is comprised of a film doped with ruthenium trisbipyridyl and methyl viologen embedded in a thin film plastic matrix,
3) the third layer 2 is a slab with the internal surface flat and joined to the second layer, and with the external surface in the shape of concave reflectors of focal length f/2,
4) a reflective coating 4 applied to the external face of the third layer.

Light Amplification Goggles

Figure 21:
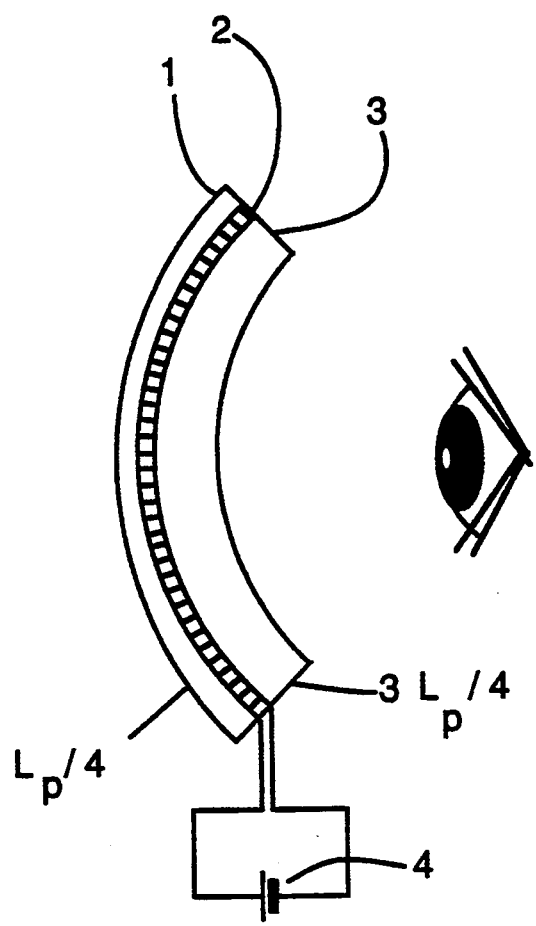
FIG. 21 demonstrates the use of microchannel technology to construct goggles capable of amplifying light.

Light amplification goggles are embodied as shown is FIG. 21. They comprise a smart window with a spherical curvature (bug eyes) centered at the observer's eyes. The pixels are normal to the window surface and are gradient-index-based as already described in FIG. 13B. The smart layer comprises a microchannel plate array. The goggles are comprised of three layers:
1) the first layer 1 is a panel of GRIN rod lenses $L_p/4$ thick,
2) the second layer 2 is a smart layer comprised of the microchannel plate controlled by a voltage 4,
3) the third layer 3 is a panel of rod lenses $3L_p/4$ thick;

Other Embodiments

While the above description contains many specificities, the reader should not construe these as limitations on the scope of the invention, but merely as exemplifications of preferred embodiments thereof. Those skilled in the art will envision many other possible variations within its scope. Accordingly the reader is requested to determine the scope of the invention by the appended claims and their legal equivalents, and not by the examples which have been given.

I claim:

1. An optical filter device comprised of:

a first array of lenses arranged to approximate a first surface, a second array of lenses arranged to approximate a second surface, with each lens in said second array positioned approximately face to face with a corresponding lens in said first array such that the optical axis of the lens in said second array is colinear with the optical axis of the corresponding lens in said first array, each lens and its colinear corresponding lens forming an ensemble defining a pixel and separated by approximately the sum of their focal lengths, said first and second arrays sharing a common focal plane located between them, said arrangement of said first array and said second array defining a transflector c) an electromagnetic wave modulating means herein called the smart layer, inserted at said common focal surface between said arrays, for modulating at least a portion of the electromagnetic wave passing through said device, combination of said smart layer and said transflector defining a smart transflector.

2. A device as in claim 1 wherein said first array and said second array are comprised of microlenses having diameters of less than 1 millimeter.

3. A device as in claim 1 in which magnification of the device is controlled by the gain of each said pixel.

4. A device as in claim 1 in which both said surfaces are flat and parallel, said pixels have their optical axes normal to said surfaces, and said pixel gain is constant.

5. A device as in claim 1 in which said curvatures are spherical and concentric, said pixels are normal and said gain is uniform.

6. A device as in claim 1 in which at least one of said array surfaces is flat, said pixels are slanted such that their optical axis radially converge to an arbitrary point.

7. A device as in claim 1 in which said curvatures are spherical, said pixels are normal and all said pixels have the same gain.

8. A device as in claim 1 in which said lenses are arranged in square formation.

9. A device as in claim 1 in which said lenses are arranged in hexagonal formation.

10. A device as in claim 1 wherein said first and second arrays of lenses are respectively molded on a side of one first slab and one side of a second slab transparent material, and the other sides of said first and second slabs are in contact with and conforming in shape with the opposite sides of said smart layer.

11. A device as in claim 1 wherein said first array and said second array are both molded on each side of a single slab of transparent material, with said smart layer material distributed throughout the bulk of said slab of transparent material.

12. A device as in claim 1 wherein a mask is applied on one side of one or both said array surfaces to restrict the said array lenses' aperture.

13. A device as in claim 1 wherein said lenses are geometric optics lenses.

14. A device as in claim 13 wherein said lenses are embedded in a slab of transparent material.

15. A device as in claim 1 wherein said lenses are gradient index lenses.

16. A device as in claim 15 wherein said first array is a gradient index layer with a low gradient, said second array is a gradient index layer with a high gradient, the combination of said first and second layers providing a means for magnification.

17. A device as of claim 16 and further comprising a fourth layer having a constant index of refraction, and positioned in between said smart layer and said first layer.

18. A device as in claim 1 and further comprising a second transflector arranged in a sandwich formation with said first transflector, at least one of said transflectors having a layer of light modulating material positioned in the focal plane between the first and second lens arrays of said transflector, said transflector defining a smart transflector, said combination of transflectors defining a device herein called a smart window.

19. A device as of claim 18 in which the lenses are chosen and arranged to create a non-inverting telescope.

20. A device as in claim 18 using geometric optics and comprising between said transflectors a transparent medium having an index of refraction different from index of refraction of said transflectors.

21. A device as in claim 18 using gradient index optics wherein some of the transflector lenses are grouped so as to reduce the number of optical surfaces and in which magnification is achieved by means of several layers of rod type gradient index lenses with differing index gradients.

22. A device as in claim 18 wherein said first array of said first transflector is comprised of an array of gradient index rod lenses with a low index gradient defining a periodicity pitch $L_{p1}$, and a length approximately equal to one quarter of $L_{p1}$ said second array of first transflector is regrouped with second transflector so as to form an array of gradient index rod lenses with a high index gradient defining a second periodicity pitch $L_{p2}$, and a length approximately equal to three quarter of $L_{p2}$.

23. A device as in claim 18 wherein said first array of said first transflector is comprised of an array of gradient index rod lenses with a low index gradient defining a periodicity pitch $L_{p1}$, and a length approximately equal to one quarter of $L_{p1}$, and said second array of said first transflector is comprised of an array of gradient index rod lenses with a high index gradient defining a periodicity pitch $L_{p2}$, and a length approximately equal to one quarter of $L_{p2}$, and said first array of said second transflector is comprised of an array of gradient index rod lenses with a low index gradient defining a periodicity pitch $L_{p1}$, and a length approximately equal to one quarter of $L_{p1}$, and said second array of said second transflector is comprised of an array of gradient index rod lenses with a high index gradient defining a periodicity pitch $L_{p2}$, and a length approximately equal to one quarter of $L_{p2}$.

24. A device as of claim 23 wherein said smart layer is inserted between said first and said second arrays of said first transflector.

25. A device as of claim 23 wherein said smart layer is inserted between said first and said second arrays of said second transflector.

26. A device as of claim 1 wherein a mask is inserted in said focal plane between the arrays.

27. A device as of claim 1 wherein the lenses of said first and second arrays are chosen and arranged so as to create a microscope with the means for performing spatial and spectral filtering.

28. A device as of claim 18 wherein said arrays of lenses of said first and second transflectors are arranged so as to create a microscope with the means for performing spatial and spectral filtering.

29. A device as in claim 1 wherein said arrays of lenses of said first and second transflectors are arranged so as to create an inverting telescope with the means for performing spatial and spectral filtering.

30. A device as in claim 18 wherein the space between the two transflectors is occupied by a transparent and thermally isolating material.

31. A device as in claim 1 wherein one or both of the arrays' faces are covered by a electromagnetic filter.

32. A device as in claim 18 wherein at least one of the arrays' faces is covered by an electromagnetic filter.

33. A device as in claim 1 and further comprising a mirror surface parallel to said first surface.

34. A device as in claim 1, further comprising a reflecting material coating one side of said transflector and conforming to the surface of the lenses of one of said first or second array of lenses, such an arrangement defining a smart mirror.

35. A device as in claim 18, wherein said first and second transflectors are imbedded in eyeglasses such as prescription glasses or sunglasses in order to provide the eyeglasses with the capability for permitting telescopic vision.

36. A device as in claim 18 wherein the lenses of said first and second transflectors are chosen and arranged, and are further separated by a thermally insulating layer to provide the means for selectively blocking the sun, and for thermal insulation.

37. A device as in claim 18 wherein the lenses of said first and second transflectors are chosen and arranged to provide the means for selectively blocking the sun in a sun visor.

38. A device as in claim 18 wherein the lenses of said first and second transflectors are chosen and arranged, and are further separated by a light amplification layer to provide the means for enhancing vision under very low light intensity.

39. A device as in claim 18 wherein the lenses of said first and second transflectors are chosen and arranged, to provide the means for creating a sun and glare blocking windshield.

40. A device as in claim 18 wherein the lenses of said first and second transflectors are chosen and arranged, to provide the means for selectively blocking the sun and the glare in a space environment.

41. A device as in claim 30 fabricated in the shape of a car rearview mirror.

42. A device as in claim 1 wherein said light modulating means modulates light intensity as a function of the intensity of said light.

43. A device as in claim 1 wherein said light modulating means modulates light polarization as a function of the intensity of said light.

44. A device as in claim 1 wherein said light modulating means modulates light phase as a function of the intensity of said light.

45. A device as in claim 1 wherein said light modulating means modulates light frequency as a function of the intensity of said light.

46. A device as in claim 1 wherein said light modulating means modulates its own absorptivity for the said light as a function of the intensity of said light.

47. A device as in claim 1 wherein said light modulating means modulates its own absorptivity to light in a frequency band different from said light, as a function of the intensity of said light.

48. A device as in claim I wherein said light modulating means modulates its own transmissivity for said light frequency or a different light frequency as a function of the intensity of said light.

49. A device as in claim 1 wherein said light modulating means modulates its reflectivity to light as a function of the intensity of said light.

50. A device as in claim 1 wherein said light modulating means modulates its refractivity to light as a function of the intensity of said light.

51. A device as in claim 1 wherein said light modulating means modulates its scattering properties as a function of the intensity of said light.

52. A device as in claim 1 wherein said light modulating means modulates its birefringence properties as a function of the intensity of said light.

53. A device as in claim 1 and further comprised of an electric field producing means for applying an electric field to said light modulating means.

54. A device as in claim 1 wherein said light modulating device comprised of a spatial light modulator.

55. A device as in claim 1 wherein said light modulating device comprised of an optically addressed spatial light modulator.

56. A device as in claim 1 wherein said light modulating device comprised of a self-electro-optic-effect device (SEED).

57. A device as in claim 1 wherein said light modulating device is comprised of thermochromic materials.

58. A device as in claim 1 wherein said light modulating device is comprised of semiconductor materials.

59. A device as in claim 1 wherein said light modulating means is comprised of photochromic glass.

60. A device as in claim 1 wherein said light modulating device is comprised of combinations of absorbing dyes.

61. A device as in claim 1 wherein said light modulating device is comprised of chemicals capable of photo-induced electron transfer between donor molecules and acceptor molecules.

62. A device as in claim 1 wherein said light modulating means is comprised of electrochromic materials sandwiched with photoconductive materials.

63. A device as in claim 1 wherein said light modulating means is comprised of optically active materials sandwiched with photoconductive materials.

64. A device as in claim 1 wherein said light modulating means is comprised of liquid crystal light valves.

65. A device as in claim 1 wherein said light modulating means is comprised of fluorescent material.

66. A device as in claim 1 wherein said light modulating means is comprised of phosphorescent material.

67. A device as in claim 1 wherein said light modulating means is comprised of microchannel plates.

68. A device as in claim 1 wherein said light modulating means is comprised of quantum well devices.

69. A device as in claim 1 where said smart layer consists of a mask having some areas transparent and some areas opaque.

70. A device as of claim 1 wherein the lenses of said first and second arrays are chosen and arranged so as to create a planar camera.

71. A device as of claim 1 wherein the lenses of said first and second arrays are chosen and arranged so as to create a planar projector.

72. A device as in claim 1 in which pixel locations define slant angles and magnification of the device is controlled by the pixel slant angles.

73. A device as in claim 1 in which said first surface is a curved surface defining a surface curvature and magnification of the device is controlled by the surface curvature.

74. A device as in claim 1 in which said second surface is a curved surface defining a surface curvature and magnification of the device is controlled by the surface curvature.

75. A device as in claim 74 wherein said first and second transflectors are embedded in a window panel for air traffic control towers.

76. A device as in claim 74, wherein said first and second transflectors are embedded in eyeglasses.

77. A device as in claim 74, wherein said first and second transflectors are embedded in a welding visor.

78. A device as in claim 16 and further comprising a fourth layer having a constant index of refraction, and positioned in between said smart layer and said second layer.

* * * * *